(12) United States Patent
Sakamoto et al.

(10) Patent No.: US 9,900,835 B2
(45) Date of Patent: Feb. 20, 2018

(54) TERMINAL DEVICE, COMMUNICATION METHOD, AND STORAGE MEDIUM

(71) Applicant: FUJITSU LIMITED, Kawasaki-shi, Kanagawa (JP)

(72) Inventors: Takuya Sakamoto, Kawasaki (JP); Hidenobu Ito, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/050,786

(22) Filed: Feb. 23, 2016

(65) Prior Publication Data
US 2016/0262095 A1  Sep. 8, 2016

(30) Foreign Application Priority Data

Mar. 6, 2015 (JP) ................................ 2015-044241

(51) Int. Cl.
| | | |
|---|---|---|
| *H04B 7/02* | (2017.01) | |
| *H04W 48/18* | (2009.01) | |
| *H04W 76/02* | (2009.01) | |
| *H04W 88/06* | (2009.01) | |

(52) U.S. Cl.
CPC ......... *H04W 48/18* (2013.01); *H04W 76/026* (2013.01); *H04W 88/06* (2013.01)

(58) Field of Classification Search
CPC .... H04W 48/18; H04W 76/021; H04W 88/06
USPC .......... 455/525, 456.1, 427, 552.1; 370/315, 370/328, 338, 352, 349, 356, 252, 235, 370/468, 221, 254; 709/238, 217, 225, 709/229; 705/10, 14.1, 26
See application file for complete search history.

(56) References Cited

U.S. PATENT DOCUMENTS

| | | | | |
|---|---|---|---|---|
| 8,873,468 | B1 * | 10/2014 | Gogate ................. | H04W 88/10 370/315 |
| 2003/0174685 | A1 * | 9/2003 | Hasebe ............... | H04M 1/2535 370/338 |
| 2004/0072581 | A1 * | 4/2004 | Tajima .................. | H04W 36/32 455/456.1 |
| 2005/0286476 | A1 * | 12/2005 | Crosswy ............. | H04M 1/7253 370/338 |

(Continued)

FOREIGN PATENT DOCUMENTS

| | | |
|---|---|---|
| JP | 2003-110751 | 4/2003 |
| JP | 2008-187417 | 8/2008 |

*Primary Examiner* — Tan H Trinh
(74) *Attorney, Agent, or Firm* — Staas & Halsey LLP

(57) ABSTRACT

A terminal device including: a first network interface configured to perform a first wireless communication with a first device, the first network interface being configured to couple to a specified network via the first device, a second network interface configured to perform a second wireless communication with a second device, and a processor configured to: select one of the first network interface and the second network interface, the first network interface being selected when the second network interface not being configured to couple to the specified network via the second device, the second network interface being selected when the second network interface being configured to couple to the specified network via the second device, and control the selected one of the first network interface and the second network interface to perform a wireless communication.

14 Claims, 18 Drawing Sheets

(56) References Cited

U.S. PATENT DOCUMENTS

| | | | |
|---|---|---|---|
| 2007/0002813 A1* | 1/2007 | Tenny | G01S 5/0242 370/338 |
| 2007/0097877 A1* | 5/2007 | Hoekstra | H04W 48/18 370/252 |
| 2007/0211675 A1* | 9/2007 | Jain | H04W 88/06 370/338 |
| 2008/0137568 A1* | 6/2008 | Ho | H04L 45/245 370/310 |
| 2009/0258649 A1* | 10/2009 | Salowey | H04W 4/02 455/435.2 |
| 2010/0063867 A1* | 3/2010 | Proctor, Jr. | G06Q 30/0623 455/414.1 |
| 2011/0205953 A1* | 8/2011 | Kuwahara | H04W 48/18 370/315 |
| 2012/0140651 A1* | 6/2012 | Nicoara | H04W 48/18 370/252 |
| 2012/0184242 A1* | 7/2012 | Li | H04L 63/0815 455/406 |
| 2012/0254464 A1* | 10/2012 | Armstrong | H04L 45/24 709/238 |
| 2012/0331173 A1* | 12/2012 | Overcash | H04L 45/306 709/238 |
| 2013/0041981 A1* | 2/2013 | Kim | H04W 48/16 709/217 |
| 2013/0107736 A1* | 5/2013 | Yamada | H04W 48/18 370/252 |
| 2013/0107794 A1* | 5/2013 | Yamada | H04W 48/18 370/315 |
| 2013/0347073 A1* | 12/2013 | Bryksa | H04L 63/105 726/4 |
| 2014/0247711 A1* | 9/2014 | Gantman | H04W 88/06 370/221 |
| 2014/0274202 A1* | 9/2014 | Zhao | H04W 88/06 455/552.1 |
| 2014/0362765 A1* | 12/2014 | Biswas | H04L 45/24 370/328 |
| 2015/0264587 A1* | 9/2015 | Fischer | H04W 92/02 455/418 |
| 2015/0312382 A1* | 10/2015 | Gantman | H04W 36/00 370/331 |
| 2015/0319662 A1* | 11/2015 | Enomoto | H04W 36/14 370/338 |
| 2016/0142911 A1* | 5/2016 | Kreiner | H04W 48/18 370/328 |
| 2016/0165650 A1* | 6/2016 | Kim | H04W 76/021 370/329 |
| 2016/0212695 A1* | 7/2016 | Lynch | H04W 48/08 |

\* cited by examiner

FIG. 16

| SSID | BSSID | INTERNET NOT UTILIZED |
|---|---|---|
| hoge | 01:02:03:04:05:06 | FALSE |
| ... | ... | ... |

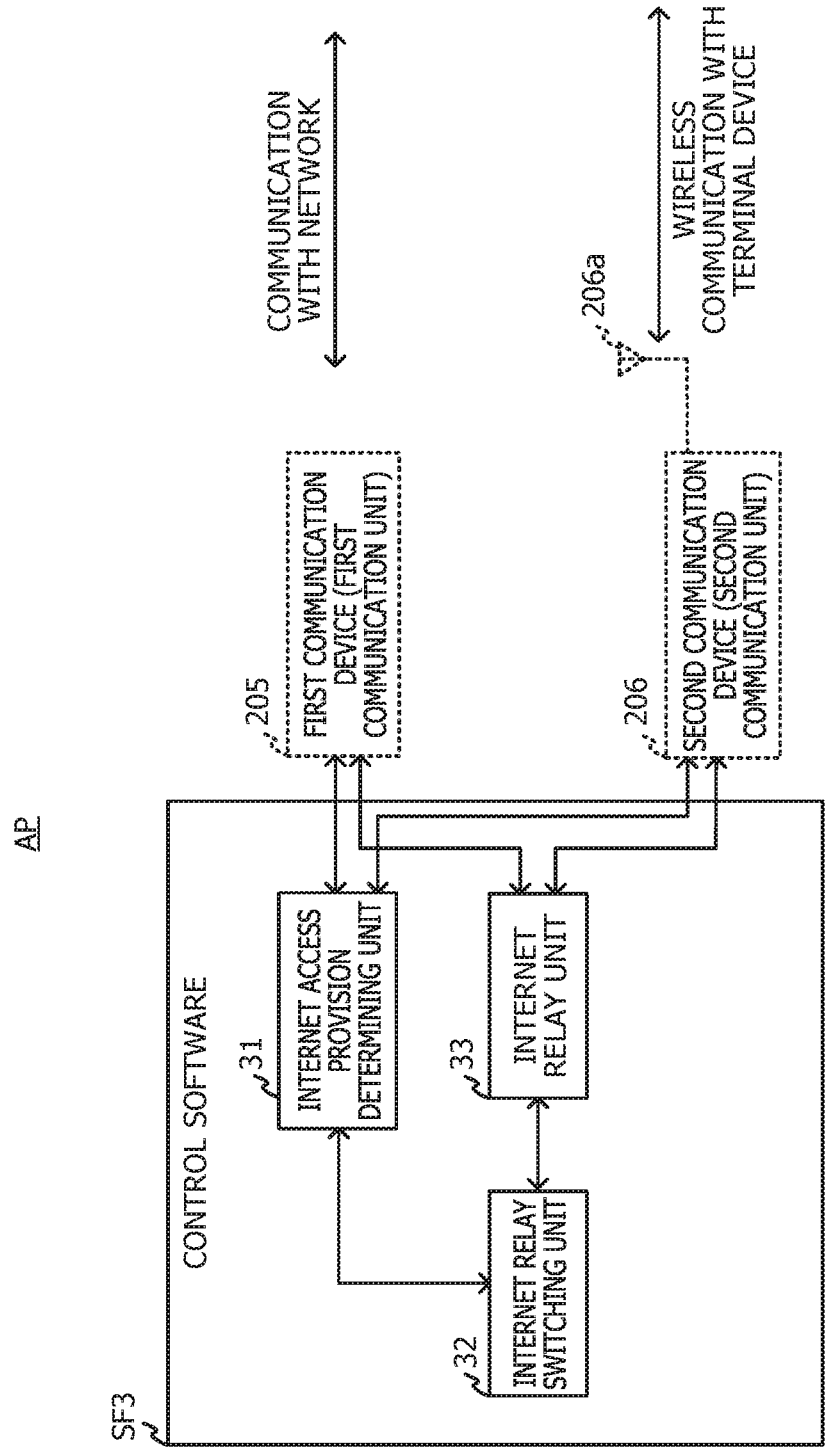

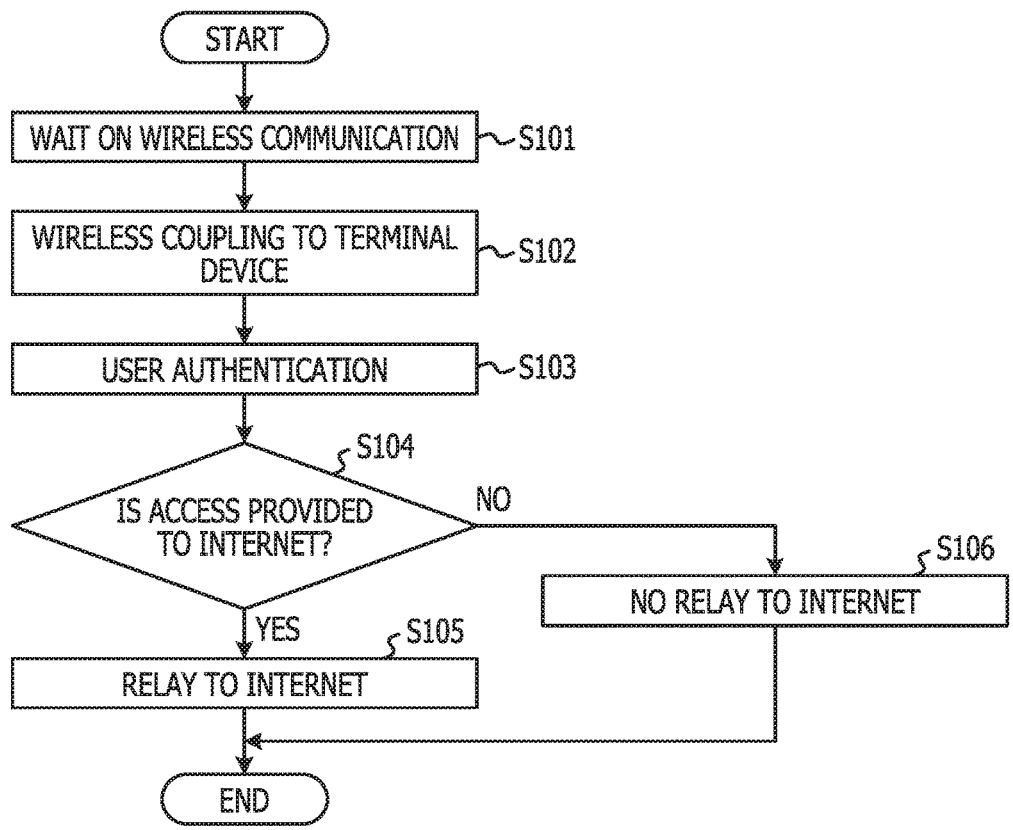

TERMINAL DEVICE, COMMUNICATION METHOD, AND STORAGE MEDIUM

CROSS-REFERENCE TO RELATED APPLICATION

This application is based upon and claims the benefit of priority of the prior Japanese Patent Application No. 2015-044241, filed on Mar. 6, 2015, the entire contents of which are incorporated herein by reference.

FIELD

The embodiments discussed herein are related to a terminal device, and a communication method for the terminal device.

BACKGROUND

The terminal device is proposed which has a plurality of wireless communication functions accompanying high functionality of a movable terminal device (for example, a mobile phone, or a smartphone).

For example, a first wireless communication function is a function in which a wireless communication method such as long term evolution (LTE) or third generation (3G) is utilized to wirelessly couple to a base station and wirelessly communicate. A second wireless communication function is, for example, a function in which wireless local area network (LAN) communication is utilized to wirelessly couple to an access point and wirelessly communicate.

For example, the terminal device executes either of the first or second wireless communication functions, wirelessly couples to the base station or the access point, and accesses a network such as the Internet.

For example, the terminal device is coupled to the base station using the first wireless communication function in a case where the terminal device is positioned out of wireless communication range of the access point. Meanwhile, the terminal device is coupled to the access point using the second wireless communication function in a case where the terminal device is positioned within the wireless communication range of the access point.

Japanese Laid-open Patent Publication No. 2008-187417 and No. 2003-110751 are examples of related art.

SUMMARY

According to an aspect of the invention, a terminal device including: a first network interface configured to perform a first wireless communication with a first device, the first network interface being configured to couple to a specified network via the first device, a second network interface configured to perform a second wireless communication with a second device, and a processor configured to: select one of the first network interface and the second network interface, the first network interface being selected when the second network interface not being configured to couple to the specified network via the second device, the second network interface being selected when the second network interface being configured to couple to the specified network via the second device, and control the selected one of the first network interface and the second network interface to perform a wireless communication.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is an example of a table which stores SSID and BSSID;

FIG. 17 is a block diagram which describes a second example of a software configuration of the access point that is described in FIG. 11; and FIG. 18 is a block diagram which describes a flow of a process of a highly functional access point.

DESCRIPTION OF EMBODIMENTS

Normally, a base station provides access to a wide-area network such as the Internet (hereinafter, referred to as the Internet, as appropriate) to a terminal device. Meanwhile, there are cases where an access point does not provide access to the Internet to the terminal device even if there are cases where the access point provides access to the Internet to the terminal device. For example, there is an access point which is coupled to only a local network that is not coupled to the Internet.

The terminal device stops using the first wireless communication function and is coupled to the access point using the second wireless communication function in a case where the terminal device is positioned within the wireless communication range of the access point. The coupled access point is not able to access the Internet in a case of the access point which does not provide access to the Internet to the terminal device. For example, the terminal device does not receive an email from a mail server which is coupled to the Internet due to the terminal device not being able to access the Internet.

In utilization of a service form which is provided via various networks, it is preferable to select an optimal wireless communication function from the plurality of wireless communication functions.

One aspect of the present embodiment has the object of selecting an optimal wireless communication function in the terminal device which has the plurality of wireless communication functions.

First Embodiment

Entire System Diagram

Figure 1:
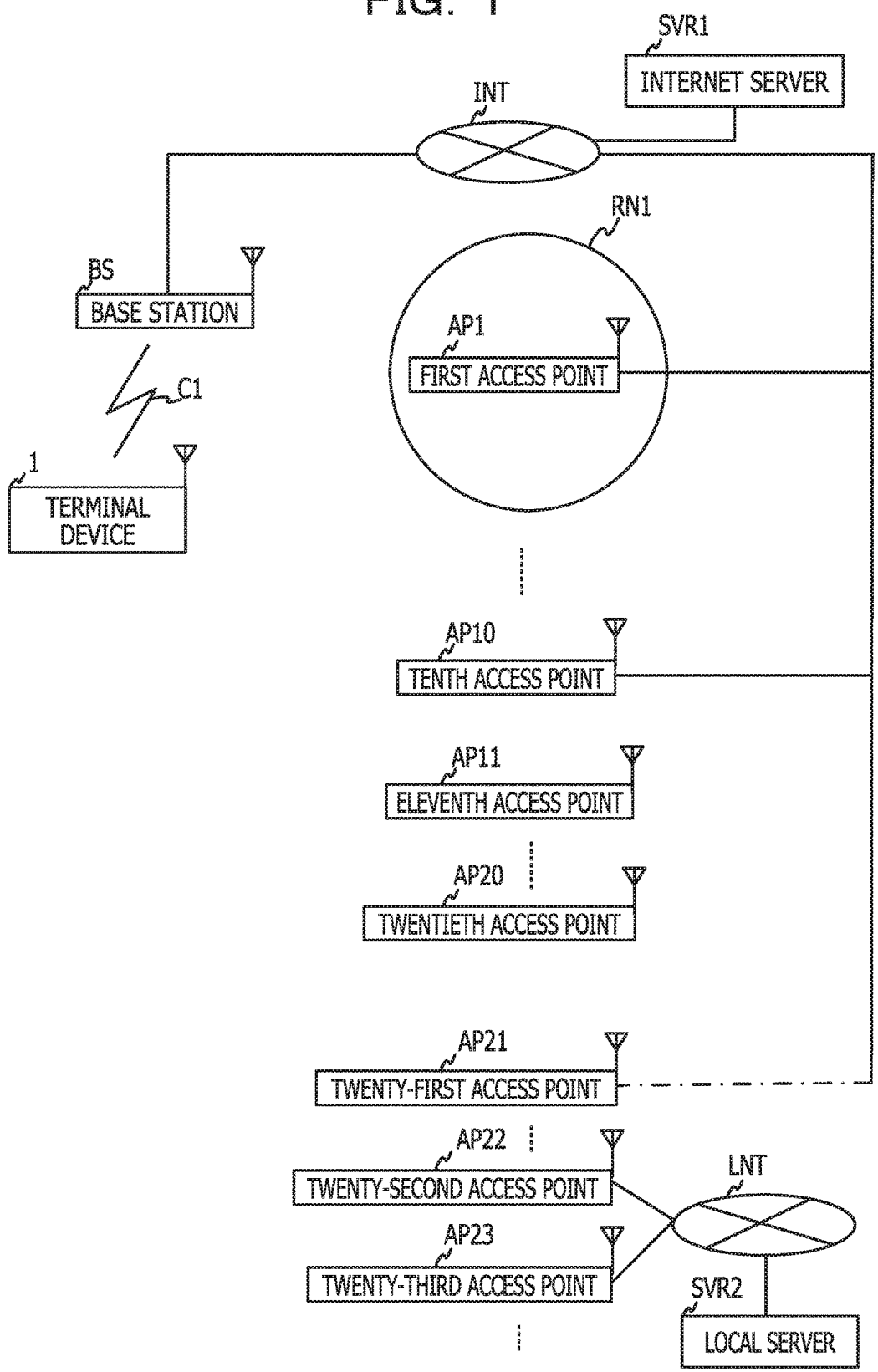
FIG. 1 is an entire system diagram which describes a terminal device of the present embodiment.

FIG. 1 is an entire system diagram which describes a terminal device of the present embodiment. Here, in the description in FIG. 1, the same elements are given the same reference numerals, and description that is already made is omitted.

A terminal device 1 is a movable wireless communication terminal, and for example, is a mobile phone, a smartphone, or a tablet terminal. The terminal device 1 has first and second wireless communication functions. That is, the terminal device 1 is a terminal device which has a plurality of wireless communication functions and a computer which executes various information processing.

A base station BS wirelessly communicates with the terminal device 1 as indicated by reference numeral C1, and for example, carries out wired communication with a core network which is not illustrated in the drawings. Here, wireless communication between the base station BS and the terminal device 1 is also referred to as mobile communication. In the wireless communication between the base station BS and the terminal device 1, for example, a wireless communication method such as LTE, 3G, or the like is utilized.

The core network is a network which is also referred to as a mobile network, a backbone line, a core network, or a carrier network, and relays the base station BS to the Internet INT which is a large-scale network. An internet server SVR1 is a server which is coupled to the Internet INT.

Access Point

For example, the access point is wirelessly coupled to the terminal device which is located within the wireless communication range using a wireless communication method in which an IEEE 802.11 standard is applied, and is a wireless communication device which wirelessly communicates with the wirelessly coupled terminal device. Here, wireless communication between the access point and the terminal device 1 is also referred to as wireless LAN communication. The access point is a device which mutually couples the terminal devices, and respectively couples the terminal devices to various networks. The number of access points is exemplified in FIG. 1. Here, in FIG. 1, as the wireless communication range, the wireless communication range of a first access point AP1 is indicated by reference numeral RN1.

The first access point AP1 to a tenth access point AP10 are coupled to the Internet INT. Then, the first access point AP1 to the tenth access point AP10 provide access to the Internet INT to the wirelessly coupled terminal device. The access point which provides access to the Internet INT to the wirelessly coupled terminal device is referred to as an internet access point, as appropriate.

An eleventh access point AP11 to a twentieth access point AP20 are access points which are not coupled to the Internet INT. A twenty-first access point AP21 is an access point (hereinafter, referred to as a switchable access point, as appropriate) which has a function of switching whether or not access to the Internet INT is provided to the terminal device according to the wirelessly coupled terminal device.

A twenty-second access point AP22 and a twenty-third access point AP23 are access points which are coupled to a local network LNT that is a network which is not coupled to the Internet INT. A local server SVR2 is a server which is coupled to the local network LNT. The local server SVR2 provides various information processes to the terminal device 1 which is wirelessly coupled to the twenty-second access point AP22 and the twenty-third access point AP23.

The eleventh access point AP11 to the twentieth access point AP20, the twenty-second access point AP22, and the twenty-third access point AP23 do not provide access to the Internet INT to the wirelessly coupled terminal device. The access point which does not provide access to the Internet INT to the wirelessly coupled terminal device is referred to below as a local access point, as appropriate.

Out of the local access points, the access point which has a function of providing various information processing to the wirelessly coupled terminal device 1 (hereinafter, referred to as a highly functional access point, as appropriate) is provided. For example, the highly functional access point is the twentieth access point AP20.

For example, the highly functional access point is installed in stores such as restaurants. As information processing, for example, the highly functional access point transmits information which relates to the shop or data in which a coupon which is able to be used at the shop is output for display to the wirelessly coupled terminal device.

Here, for example, a device such as a digital camera or a printer has a function in which it is possible to communicate within the device using a wireless communication method which applies the IEEE 802.11 standard. The device also functions as the local access point.

The first access point AP1 to the twenty-third access point AP23 regularly broadcast packets which are normally referred to as beacons. For example, the beacon includes various information which is desired in wireless communication such as a service set identifier (SSID), a basic service set identifier (BSSID), a supported transmission speed, an encryption type, and a channel frequency. The terminal device 1 identifies the access point using an SSID and a BSSID. The SSID is an identifier which identifies the network which is formed using the access point that broadcasts the beacon including the SSID. The BSSID is an identifier which uniquely identifies the access point that broadcasts the beacon including the BSSID.

Mobile Communication and Wireless LAN Communication

In the current state, the access point is installed at various locations (for example, a general home, in the city, a private facility, and a public facility). In addition, wireless LAN communication has a higher communication speed than mobile communication in which the wireless communication method such as LTE or 3G is utilized, and has various advantages such as low power consumption. In addition, a large number of terminal devices are coupled to the base station BS, and when a mobile network is accessed, communication is congested and access becomes difficult. In addition, in the current state, a carrier actively works to offload, where the network other than the mobile network (for example, a wireless LAN network) is bypassed, increased communication traffic. Here, the wireless LAN network is a network that includes access points.

In the current state, the number of users of the terminal devices, which actively utilize the access point, increases.

Here, the carrier causes a limit on the communication speed, and the user actively utilizes the access point in a case where an amount of communication of the mobile network communication that the user uses exceeds a specified amount of communication. For example, the amount of communication is an amount of communication in units of one month or one day. In addition, the carrier is an operator who provides mobile phone telecommunication services or an operator who provides a subscriber identity module (SIM) of a mobile virtual network operator (MVNO).

For example, the terminal device executes the following processes during wireless communication with the access point. The terminal device scans radio waves at each predetermined timing (for example, ten second intervals), and receives the beacon which is transmitted from the access point. When the terminal device receives the beacon, the terminal device is wirelessly coupled to the access point that broadcasts the beacon based on the received beacon. Then, the terminal device wirelessly communicates with the access point after authentication. Then, the terminal device stops mobile communication with the base station BS. Here, the user of the terminal device sets coupling information of the access point (for example, the SSID and a pre-shared key (PSK)) in advance in the terminal device.

However, the terminal device wirelessly communicates with the local access point, and when mobile communication with the base station BS is stopped, it is not possible to access the Internet INT. When it is not possible to access the Internet INT, for example, the user of the terminal device is not able to access a website on the Internet using a browser, and it is not possible to receive email from a server on the Internet.

Therefore, the terminal device 1 of the present embodiment stops mobile communication with the base station BS in a case where the access point that wirelessly communicates provides access to the Internet. Meanwhile, the terminal device 1 continues mobile communication with the base station BS and accesses the Internet in a case where the access point that wirelessly communicates does not provide access to the Internet. That is, in the terminal device 1 which is able to execute the plurality of wireless communication functions, an appropriate wireless communication function is selected. The terminal device 1 in which the appropriate wireless communication function is selected will be described below.

Hardware Configuration

Figure 2:
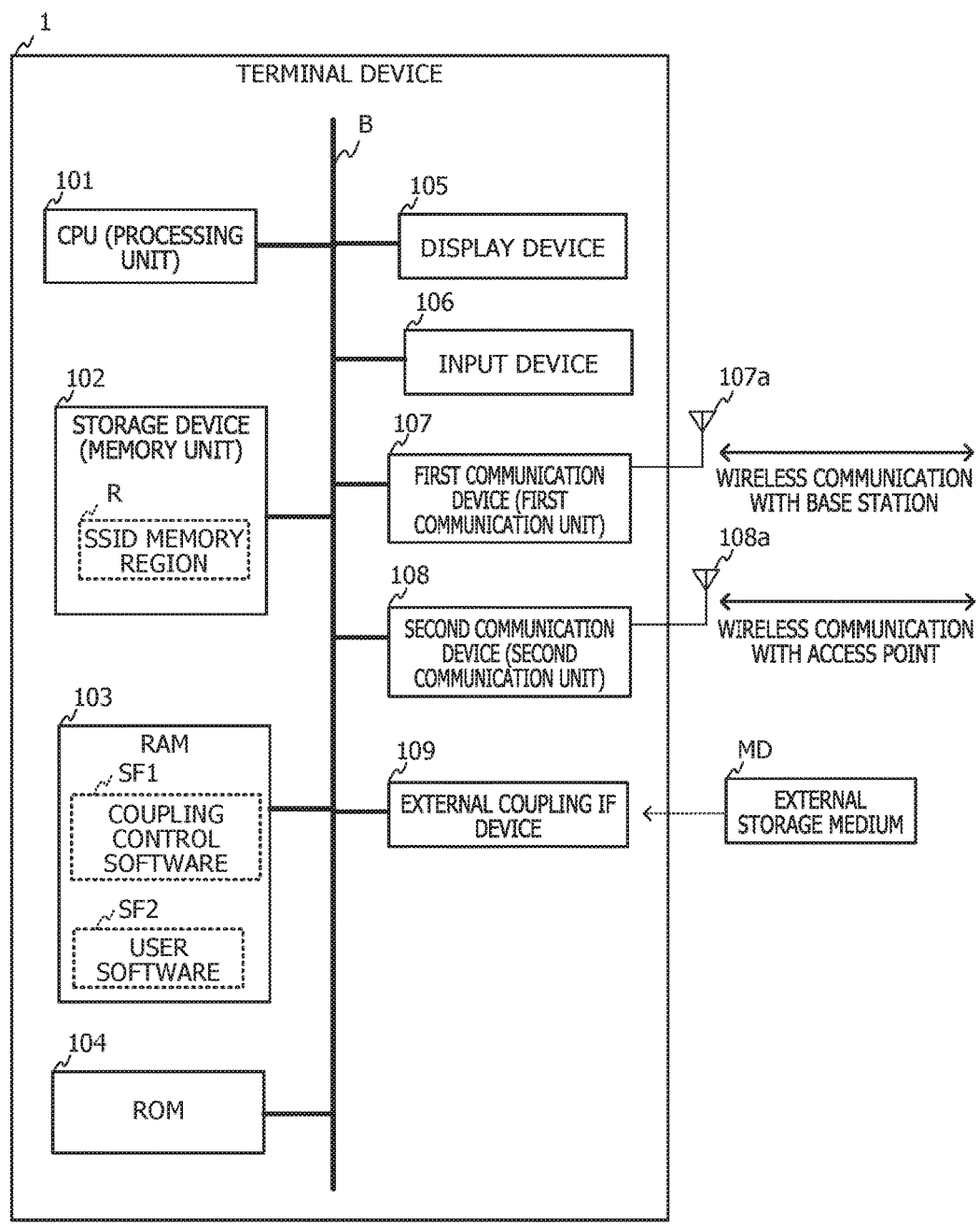
FIG. 2 is a block diagram illustrating a hardware configuration of a terminal device in FIG. 1.

FIG. 2 is a block diagram illustrating a hardware configuration of the terminal device 1 in FIG. 1. The terminal device 1 is coupled to a bus B, and has a CPU 101, a storage device (memory unit) 102, a RAM 103, a ROM 104, and a display device 105. Furthermore, the terminal device 1 has an input device 106, a first communication device (first communication unit) 107, a second communication device (second communication unit) 108, and an externally coupled IF device 109.

Below, the storage device (memory unit) 102 is referred to as a storage 102, as appropriate, the first communication device (first communication unit) 107 is referred to as a first communication device 107, as appropriate, and the second communication device (second communication unit) 108 is referred to as a second communication device 108, as appropriate. The first and second communication devices are also respectively referred to as first and second wireless communication devices. Here, CPU is an abbreviation of "central processing unit", RAM is an abbreviation of "random access memory", and ROM is an abbreviation of "read only memory".

The CPU 101 is a central processing unit which controls the entire terminal device 1. For example, the storage 102 is a large-capacity storage device such as a hard disk drive (HDD), a solid state drive (SSD), and a non-volatile semiconductor memory.

The storage 102 has an SSID memory region R which stores the SSID. The RAM 103 temporarily stores the processes which are executed by the CPU 101, data which is generated (calculated) in each step in which coupling control software SF1 and user software SF2 are executed, and the like. For example, the RAM 103 is a semiconductor memory such as a dynamic random access memory (DRAM).

Figure 3:
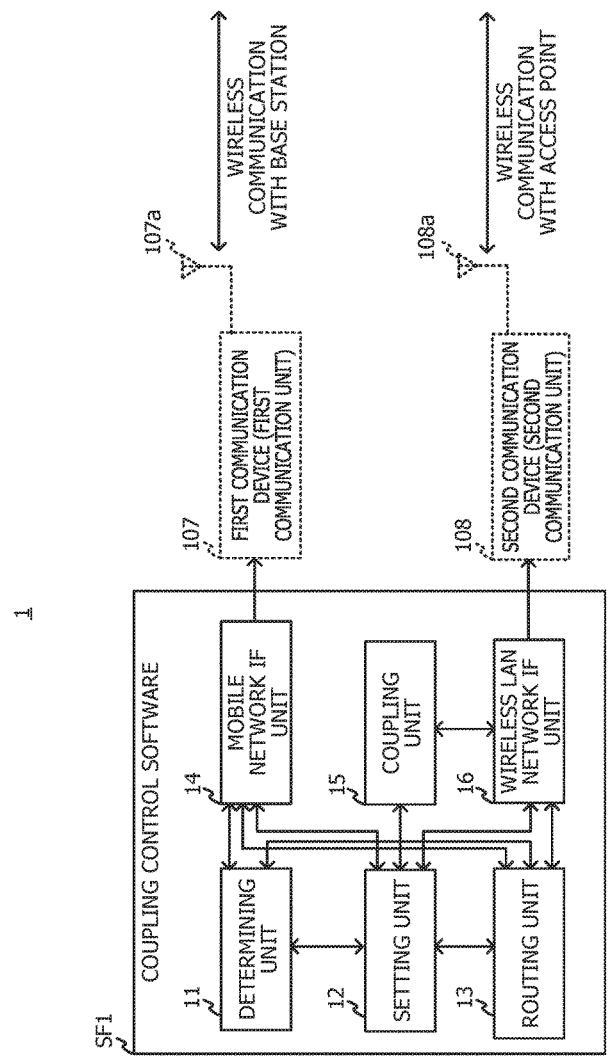
FIG. 3 is a block diagram which describes a software configuration of the terminal device in FIG. 1.

The coupling control software SF1 is an application which executes various coupling control, and is described in detail in FIG. 3. The user software SF2 is an application which receives various services that are provided by various servers (for example, an internet server SVR1 and a local server SVR2 in FIG. 1). The user software SF2 generates communication data (also simply referred to as data) where the internet server SVR1, the local server SVR2, and the highly functional access point are set as transmission destinations, and the communication data is output to the coupling control software SF1.

The CPU 101 reads out an execution file of the coupling control software SF1 and the user software SF2 from the ROM 104 and develops in the RAM 103 during start up of the terminal device 1. Here, the execution file may be stored in an external storage medium MD.

The ROM 104 stores various data, for example, the execution files (programs) of the coupling control software SF1 and the user software SF2. The display device 105 displays various information such as images and characters on a display surface (not illustrated in the drawings). For example, the display device 105 is a liquid crystal panel.

The input device 106 inputs operation information to the terminal device 1. For example, the input device 106 is a touch panel, and detects coordinates which indicate contact positions of a body with respect to the display surface.

The first communication device 107 transmits and receives radio waves from an antenna 107a, and for example, executes first wireless communication (mobile communication) with a first device which is coupled to the network using the wireless communication method such as LTE or 3G. The network is a wide-area network such as the Internet INT. For example, the first device is the base station BS.

The second communication device 108 transmits and receives radio waves from an antenna 108a, and for example, executes second wireless communication (wireless LAN communication) with a second device using the wireless communication method in which the IEEE 802.11 standard is applied. For example, the second device is the access point.

The externally coupled IF device 109 is a device which functions as an interface for coupling the terminal device 1 and the external storage medium MD. Here, "IF" is an abbreviation of interface. For example, the externally coupled IF device 109 is a USB port.

Here, the externally coupled IF device 109 may be configured to be coupled to a storage medium reading device (not illustrated in the drawings) which reads data that is stored in the storage medium. For example, the storage medium (also referred to as a recording medium) is a portable storage medium such as compact disc read only memory (CD-ROM) or a digital versatile disc (DVD).

Software Configuration

FIG. 3 is a block diagram which describes a software configuration of the terminal device 1 in FIG. 1. The coupling control software SF1 has a determining unit 11, a setting unit 12, a routing unit 13, a mobile network IF unit 14, a coupling unit 15, and a wireless LAN network IF unit 16. Here, in FIG. 3, each unit (11 to 16) is able to transmit and receive various signals with each other. In FIG. 3, the first communication device 107 and the second communication device 108 which are hardware elements are indicated by dotted lines.

The determining unit 11 is an example of a determining unit (also referred to as a coupling determining unit) which determines whether the access point provides access to the Internet INT. In detail, the determining unit 11 determines whether or not there is a coupling to the Internet INT using the access point that is wirelessly coupled using the second communication device 108. Then, the first communication device 107 executes or stops mobile communication according to a determination result of the determining unit.

The setting unit 12 sets the information which relates to communication routing (referred to as routing information, as appropriate) in the routing unit 13.

The routing unit 13 routes communication data that is output from the user software SF2 on the first communication device 107 side or routes the communication data on the second communication device 108 side based on the set routing information. Here, the routing unit 13 routes the communication data on the first communication device 107 side (mobile communication side) via the mobile network IF unit 14. In addition, the routing unit 13 routes the communication data on the second communication device 108 side (wireless LAN communication side) via the wireless LAN network IF unit 16. The routing unit 13 is an example of a transfer unit which performs transfer of data.

The mobile network IF unit 14 provides the interface with respect to the first communication device 107 to the routing unit 13.

The coupling unit 15 executes a process for coupling to the access point. The coupling unit 15 scans radio waves at each predetermined timing, and receives the beacon which is transmitted from the access point via the second communication device 108. When the coupling unit 15 receives the beacon, the coupling unit 15 is wirelessly coupled to the access point that broadcasts the beacon based on the received beacon.

The wireless LAN network IF unit 16 provides the interface with respect to the second communication device 108 to the setting unit 12, the routing unit 13, and the coupling unit 15. Here, the wireless LAN network IF unit 16 outputs communication data which is received from the second communication device 108 to the routing unit 13 and the coupling unit 15 according to the contents of the communication data. The routing unit 13 outputs the output communication data to the user software SF2 or the determining unit 11 according to the contents of the communication data.

Operation Description

Figure 4:
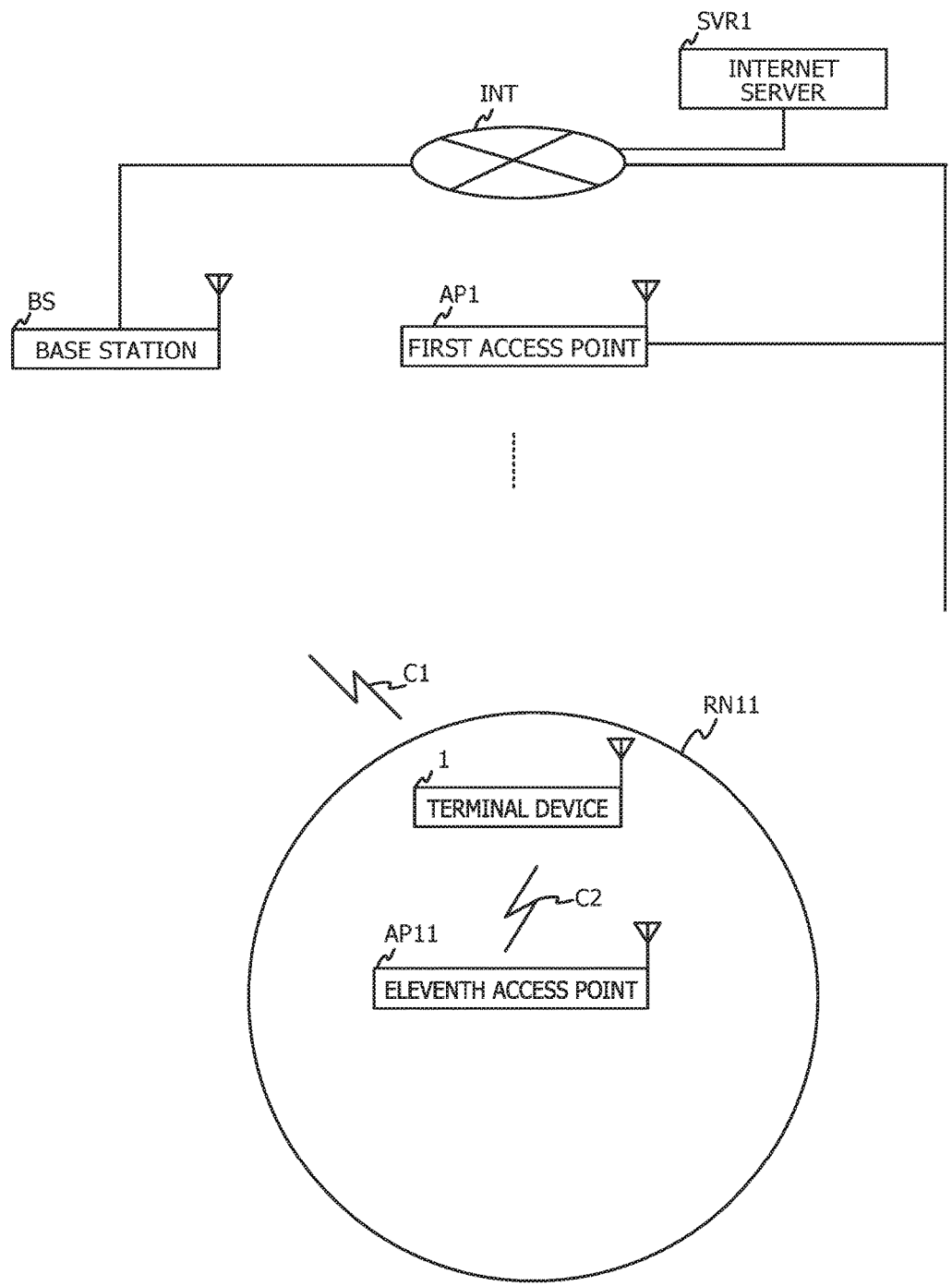
FIG. 4 is a first diagram which describes an operation of the terminal device in FIG. 1.

The operation of the terminal device 1 in the present embodiment is described with reference to FIGS. 4 and 5. FIG. 4 is a first diagram which describes an operation of the terminal device 1 in FIG. 1.

FIG. 4 indicates the eleventh access point AP11 out of the access points described in FIG. 1. Here, the first communication device 107 of the terminal device 1 executes wireless communication (refer to reference numeral C1) with the base station BS. The user of the terminal device 1 moves to within a wireless communication range RN11 of the eleventh access point AP11. By doing this, the second communication device 108 of the terminal device 1 is wirelessly coupled (refer to reference numeral C2) to the wirelessly couplable eleventh access point AP11.

When the determining unit 11 determines that there is no coupling to the Internet INT using the wirelessly coupled eleventh access point AP11, thereafter the first communication device 107 executes (that is, continues) wireless communication, and couples to the Internet INT.

Figure 5:
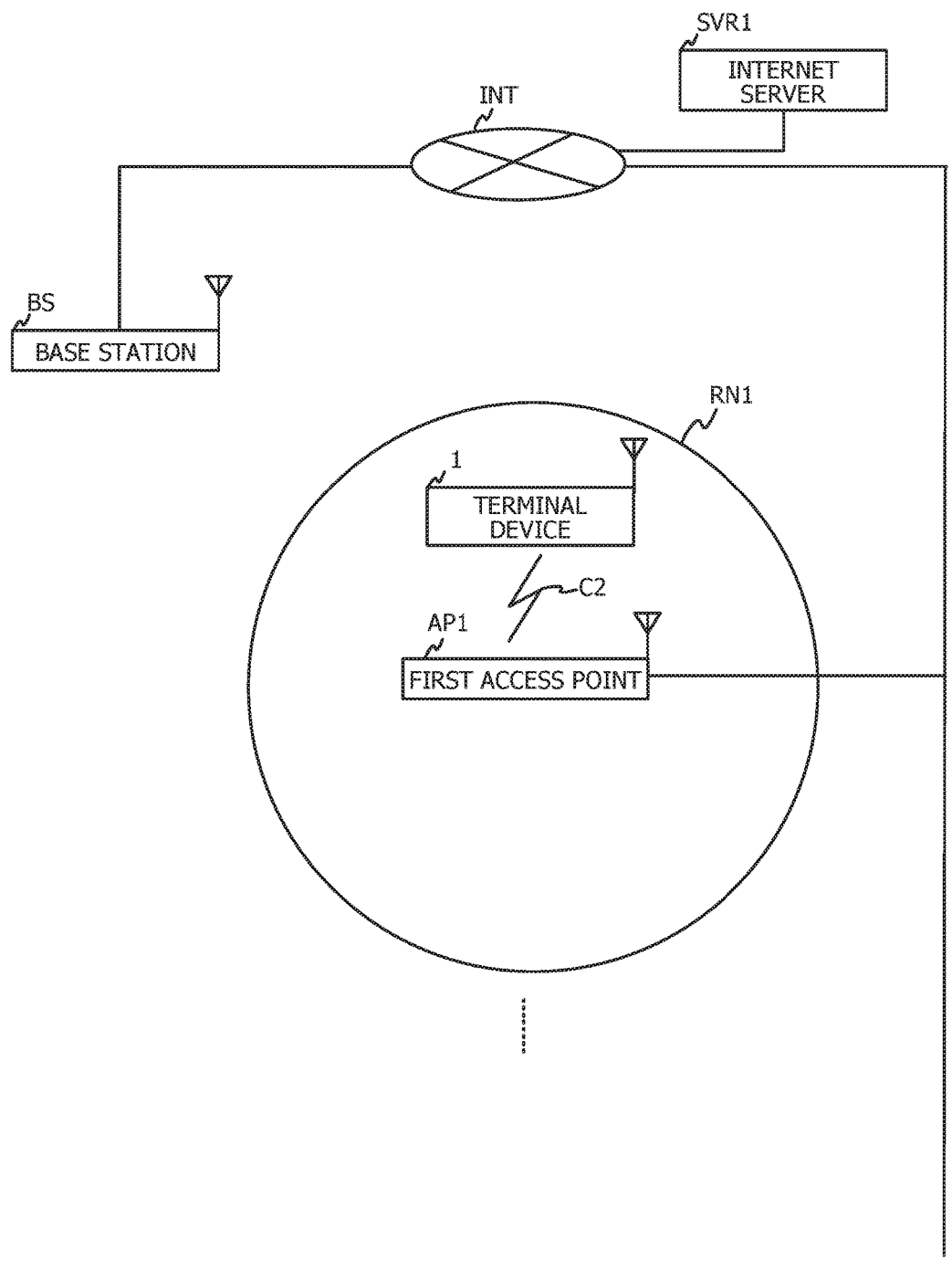
FIG. 5 is a second diagram which describes an operation of the terminal device in FIG. 1.

FIG. 5 is a second diagram which describes an operation of the terminal device 1 in FIG. 1. FIG. 5 indicates the first access point AP1 out of the access points described in FIG. 1. Here, the first communication device 107 of the terminal device 1 executes wireless communication with the base station BS. The user of the terminal device 1 moves to within a wireless communication range RN1 of the first access point AP1. By doing this, the second communication device 108 of the terminal device 1 is wirelessly coupled (refer to reference numeral C2) to the wirelessly couplable first access point AP1.

When the determining unit 11 determines that there is a coupling to the Internet INT using the wirelessly coupled first access point AP1, the first communication device 107 stops mobile communication. Then, the second communication device 108 executes wireless LAN communication and couples to the Internet INT.

As described in FIGS. 4 and 5, the terminal device 1 of the present embodiment is able to automatically select the optimal wireless communication function with which it is possible to couple to the Internet INT from the plurality of wireless communication functions.

Flow Diagram

Figure 6:
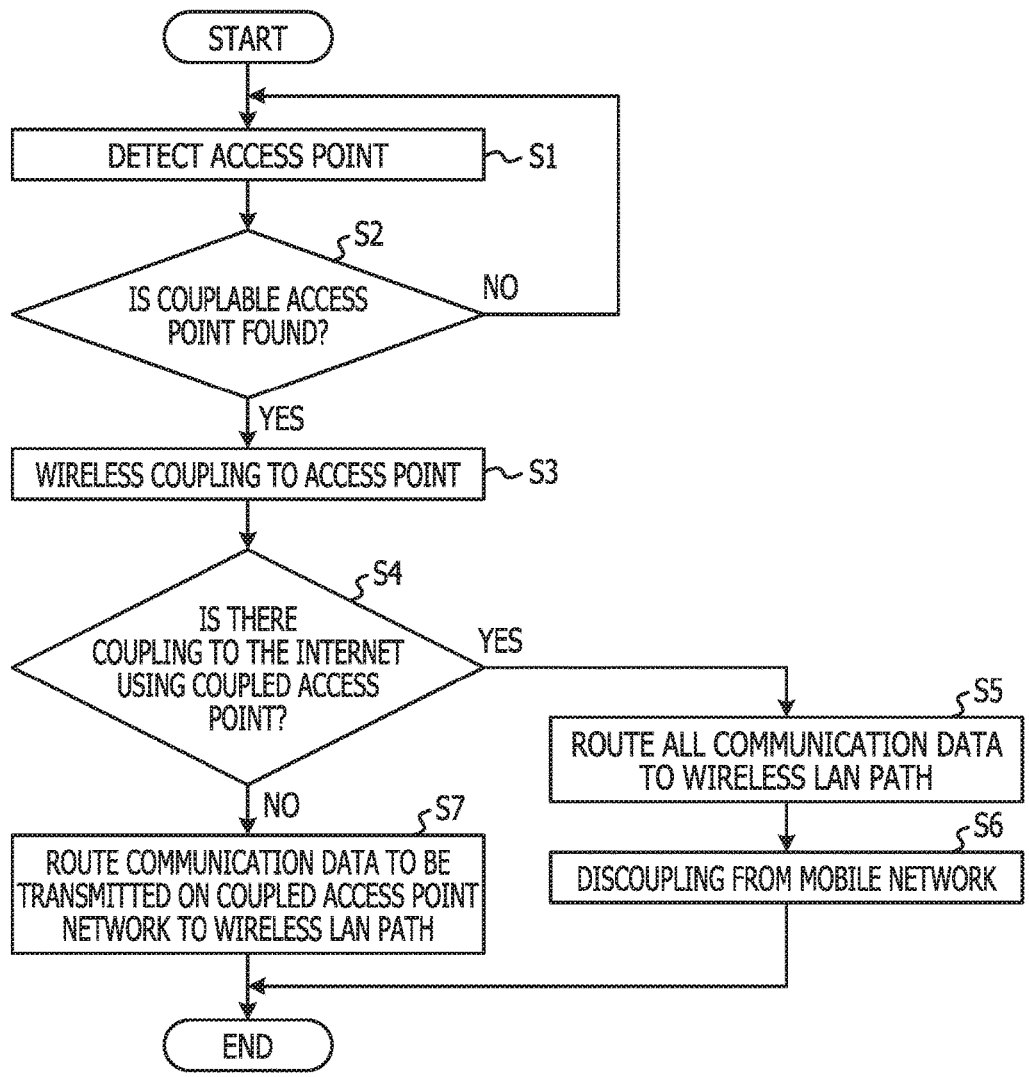
FIG. 6 is a flow diagram which describes a flow of the process of the terminal device of a first embodiment.

FIG. 6 is a flow diagram which describes a flow of the process of the terminal device 1 of the first embodiment. In the description of the flow diagram below, "Ss" (lower case s is an integer of one or more) has the meaning of step Ss, and the characters in the step are omitted as appropriate. In addition, in the contents of the same process, the same reference numerals are given, and description of the contents of the processes is omitted. Here, before the description of S1, coupling information (for example, SSID and the like) of the access point at which wireless communication is permitted is set in the storage 102 in advance.

Step S1: the coupling unit 15 scans radio waves at each predetermined timing, receives the beacon which is transmitted from the access point, and detects the access point.

Step S2: the coupling unit 15 determines whether a couplable access point is found. The couplable access point is the access point at which coupling to the terminal device 1 is permitted, and is an access point in which a wireless radio wave strength of the access point is a predetermined radio wave strength or more. In a case where the couplable access point is not found (S2/NO), the process returns to S1.

Step S3: the coupling unit 15 is wirelessly coupled to the access point which is found in S2 (hereinafter, referred to as a found access point, as appropriate) via the second communication device 108.

After wirelessly coupling, in a case where a request is made from the found access point such that a user identifier and a password are input, the user of the terminal device 1 inputs the user identifier and the password via the input device 106 of the terminal device 1. Here, in addition to the user identifier, in a case where a request is made from the found access point such that the SSID is input, the user of the terminal device 1 inputs the SSID via the input device 106 of the terminal device 1. Information which includes the user identifier, the password, and the SSID are referred to below as authentication information, as appropriate.

The coupling unit 15 of the terminal device 1 transmits the input authentication information to the found access point. The found access point authenticates the terminal device 1 based on the received authentication information. When authentication is successful, the found access point establishes coupling to the terminal device 1, then performs wireless communication with the terminal device 1 for which the coupling is established. The found access point transmits an internet protocol (IP) address for the terminal device 1 or an IP address of a default gateway which is managed by the found access point to the terminal device 1. The coupling unit 15 receives the IP address for the terminal device 1 and the IP address of the default gateway, and stores in the storage 102.

Step S4: the determining unit 11 determines whether there is a coupling to the Internet INT using the access point that is wirelessly coupled in S3 (hereinafter, referred to as a coupled access point, as appropriate). That is, the determining unit 11 determines whether it is possible to couple to the Internet INT using the coupled access point.

For example, a case is assumed (hereinafter, referred to as a first case, as appropriate) in which the coupled access point is an internet access point (for example, the first access point AP1 in FIG. 1). In the first case, the determining unit 11 determines that there is a coupling to the Internet INT using the coupled access point (S4/YES). In the case of coupling (S4/YES), the process transitions to S5.

That is, the determining unit 11 determines that there is a coupling to the Internet INT using the access point which is wirelessly coupled using the second communication device 108 (S4/YES), and the process transitions to S5.

Meanwhile, a case (hereinafter, referred to as a second case, as appropriate) is assumed in which the coupled access point is a local access point (for example, the eleventh access point AP11 in FIG. 1). In the second case, the determining unit 11 determines that there is no coupling to the Internet INT using the coupled access point (S4/NO). In the case of no coupling (S4/NO), the process transitions to S7.

That is, the determining unit 11 determines that there is no coupling to the Internet INT using the access point which is wirelessly coupled using the second communication device 108 (S4/NO), and the process transitions to S7.

Here, various methods for the determination process of S4 are described in detail below in a second embodiment.

Step S5: the routing unit 13 routes all communication data to a communication path for the wireless LAN communication (hereinafter, referred to as a wireless LAN path, as appropriate). That is, the routing unit 13 transfers transmission data to the wirelessly transmitted access point via the second communication device 108.

In detail, the routing unit 13 transfers the communication data which is transmitted on each server (for example, an internet server or a local server) using the user software SF2 to the second communication device 108 via the wireless LAN network IF unit 16. The second communication device 108 transmits the transferred data to the coupled access point. In addition, the routing unit 13 outputs the communication data which is received by the second communication device 108 to the user software SF2. Here, the second communication device 108 outputs the communication data which is received from the coupled access point to the wireless LAN network IF unit 16. The wireless LAN network IF unit 16 outputs the output communication data to the routing unit 13 or the coupling unit 15.

Step S6: the mobile network IF unit 14 discouples from the mobile network (also referred to as a mobile communication path). In detail, the mobile network IF unit 14 sends an operation stop instruction to the first communication device 107. The first communication device 107 stops the wireless communication (mobile communication) in response to the stop instruction.

Step S7: the routing unit 13 only routes the communication data which is transmitted on the network of the coupled access point on the wireless LAN path. In addition, the routing unit 13 routes the communication data other than the communication data which is transmitted on the network of the coupled access point on the mobile communication path.

That is, the routing unit 13 transfers the following first communication data and second communication data to the coupled access point via the second communication device 108.

The first communication data is data which sets the coupled access point as a transmission destination. For example, the coupled access point is a highly functional access point which does not provide access to the Internet.

The second communication data is data which couples the coupled access point and sets a device (local server SVR2) which is coupled to a network other than the Internet INT (for example, the local network LNT) as the transmission destination.

In detail, the routing unit 13 transfers the first and second communication data to the wireless LAN network IF unit 16. The wireless LAN network IF unit 16 outputs the transferred communication data to the second communication device 108. The second communication device 108 transmits the output communication data to the coupled access point.

In addition, the routing unit 13 transfers third communication data which sets the device that is coupled to the Internet INT (for example, the internet server SVR1) as the transmission destination to the base station BS via the first communication device 107.

In detail, the routing unit 13 transfers the third communication data to the mobile network IF unit 14. The mobile network IF unit 14 outputs the transferred communication data to the first communication device 107. The first communication device 107 transmits the output communication data to the base station BS.

For example, in S7, the routing unit 13 may set the default gateway in the mobile network IF unit 14, meanwhile, the routing unit 13 may not set the default gateway in the wireless LAN network IF unit 16. Due to this setting, the routing unit 13 is only able to route the communication data which is transmitted on the network of the coupled access point on the wireless LAN path.

Here, in a case where the routing unit 13 sets the default gateway to the mobile network IF unit 14, the routing unit 13 performs an execution instruction of a shell command described below in the operation system. For example, in a case where the operating system is Android (Android is a registered trademark), the shell command is a command indicated by "route add default dev rmnet0".

The command is instructed to the operating system such that the default gateway is set to the mobile network IF unit 14.

Here, the first communication device 107 outputs the communication data which is received from the base station BS to the mobile network IF unit 14. The mobile network IF unit 14 outputs the output communication data to the routing unit 13. The routing unit 13 outputs the output communication data to the user software SF2.

In the same manner, the second communication device 108 outputs the communication data which is received from the access point to the wireless LAN network IF unit 16. The wireless LAN network IF unit 16 selectively outputs the output communication data to the setting unit 12, the routing unit 13, and the mobile network IF unit 14 according to the contents of the communication data. The routing unit 13 selectively outputs the output communication data to the user software SF2 or the determining unit 11 according to the contents of the communication data.

According to the present embodiment, the terminal device is able to access the Internet using the access point if the wirelessly coupled access point is an internet access point. Then, the terminal device stops the mobile communication with the base station BS. It is possible to suppress power consumption in the terminal device by stopping the mobile communication. Furthermore, the communication traffic is able to bypass networks other than the mobile network (for example, the wireless LAN network).

Meanwhile, the terminal device continues the mobile communication with the base station BS if the wirelessly coupled access point is a local access point. It is possible to access the Internet by continuing the mobile communication. Furthermore, since the terminal device is able to wirelessly communicate with the access point, it is possible to utilize a service in which the access point is provided and a service in which the network of the access point is provided.

In this manner, the terminal device is able to select the optimal wireless communication function which is able to couple to the Internet from the plurality of wireless communication functions.

Second Embodiment

The second embodiment describes a first example of a process (S4 in FIG. 6) which determines whether there is a coupling to the Internet INT using the coupled access point, which is described in the first embodiment.

The storage 102 stores the identifier (for example, the SSID and the BSSID) which identify the access point which is not coupled to the Internet INT.

When the identifier of the wirelessly coupled access point is stored in the storage 102, the determining unit 11 determines that there is no coupling to the Internet INT using the access point which is wirelessly coupled using the second communication device 108. Meanwhile, when the identifier of the wirelessly coupled access point is not stored in the storage 102, the determining unit 11 determines that there is a coupling to the Internet INT using the access point which is wirelessly coupled using the second communication device 108.

The first example is described with reference to FIGS. 7 to 9.

Settings Screen

Figure 7:
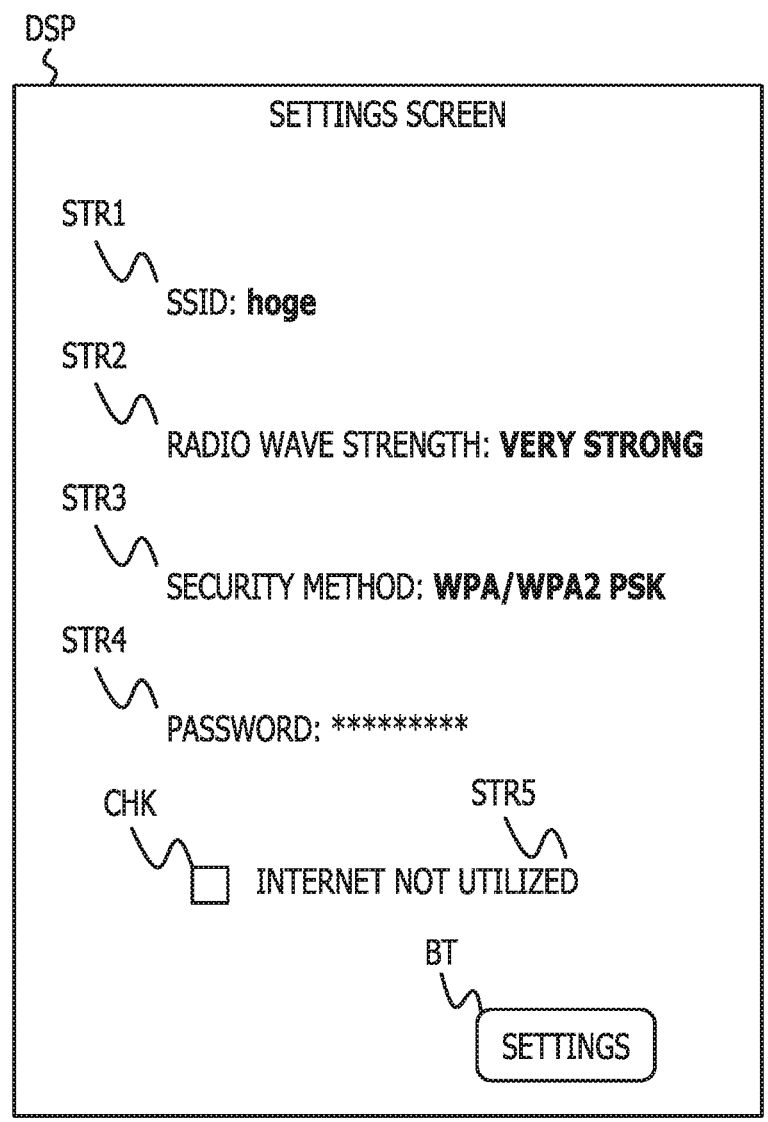
FIG. 7 is a diagram illustrating an example of a settings screen which is displayed on a second display device in FIG. 2.

FIG. 7 is a diagram illustrating an example of a settings screen which is displayed on the display device 105 in FIG. 2. The determining unit 11 performs the determination process (S4) with reference to the input SSID via the settings screen.

When the coupling unit 15 is wirelessly coupled (S3) to the found access point, a settings screen DSP which is indicated in FIG. 7 is displayed on the display device 105 in FIG. 2.

"SSID: hoge" (refer to reference numeral STR1) which indicates the SSID of the coupled access point (refer to S3) that is "hoge" is displayed on the settings screen DSP. Then, "radio wave strength: very strong" (refer to reference numeral STR2) which indicates that the radio wave strength of the wirelessly coupled access point is very strong is displayed on the settings screen DSP.

Furthermore, a security system "WPA/WPA2 PSK" in communication between the access point and the terminal device 1 which are specified by the SSID ("hoge") is displayed (refer to reference numeral STR3) on the settings screen DSP. Here, "WPA" is an abbreviation of "Wi-Fi (registered trademark) protected access".

Furthermore, an authentication password input column (refer to reference numeral STR4) during coupling to the access point which is specified by the SSID "hoge" is displayed on the settings screen DSP. Here, a character string "*********" indicates the input password.

Furthermore, a character string "internet not utilized" (refer to reference numeral STR5) which indicates no access to the Internet using the access point which it is possible to specify using a check box CHK and the SSID "hoge" is displayed on the settings screen.

The user inputs the password via the input device 106 (refer to FIG. 1) to the password input column (refer to reference numeral STR4) on the settings screen DSP.

The user recognizes in advance that the access point which it is able to specify using the SSID ("hoge") is not the access point which provides access to the Internet INT. Therefore, the user sets the check box CHK to on by touching the check box CHK. By setting on, the terminal device is able to determine that the access point which is specified by the SSID ("hoge") is not the access point that provides access to the Internet INT.

Then, when the user touches a setting button BT, the coupling unit 15 stores various information which relates to the settings screen DSP in an SSID table.

SSID Table

Figure 8:
FIG. 8 is an example of an SSID table.

FIG. 8 is an example of an SSID table. The SSID table is a table which is referenced when determining whether it is possible to access the Internet INT using the wirelessly coupled access point.

A first SSID table T1 has the SSID column, a security system column, a password column, and an internet non-utilization column. The first SSID table T1 is stored in an SSID memory region R of the storage 102 in FIG. 2.

The SSID column is a column which stores the SSID of a couplable access point. The security system column is a column which stores the security system in communication between the access point which it is possible to specify using the SSID and the terminal device 1.

The password column is a column which stores the authentication password when coupling the access point which it is possible to specify using the SSID. The internet non-utilization column is a column which stores information that indicates whether or not the access point which it is possible to specify using the SSID provides access to the Internet. Here, the access point which it is possible to specify using the SSID providing access to the Internet is indicated by the flag "false". Meanwhile, the access point which it is possible to specify using the SSID not providing access to the Internet is indicated by the flag "true".

In the settings screen DSP which is described in FIG. 7, the user inputs the password (refer to reference numeral STR4), and touches the setting button BT to set the check box CHK to on. By doing this, as indicated in FIG. 8, the coupling unit 15 stores "hoge" as the SSID in the SSID column, and stores "WPA/WPA2 PSK" as the security system in the security system column. Furthermore, as indicated in FIG. 8, the coupling unit 15 stores "password" in the password column as the password, and stores the flag "true" in the internet non-utilization column.

As described above, the coupling unit 15 respectively stores an SSID, the security SSID method, and the password which are displayed on the settings screen DSP in the SSID column, the security system column, and the password column. In a case where the check box CHK is on, the coupling unit 15 stores the flag "true" in the internet non-utilization column, and in a case where the check box CHK is off, the coupling unit 15 stores the flag "false" in the internet non-utilization column.

Here, the coupling unit 15 stores various information in the first SSID table T1 in FIG. 8 via the settings screen DSP. However, the terminal device 1 may not store various information in the first SSID table T1 via the settings screen DSP. For example, the internet server SVR1 in FIG. 1, the local server SVR2 in FIG. 1, and the highly functional access point (for example, the twentieth access point AP20 in FIG. 1) transmit the first SSID table T1 to the terminal device 1. When the setting unit 12 of the terminal device 1 receives the first SSID table T1, the setting unit 12 of the terminal device 1 is stored in the storage 102.

As described above, the storage 102 associates and stores the identifier (for example, the SSID) which identifies the access point, and information (for example, the flags "true" and "false") which indicates whether or not the access point is coupled to the Internet INT.

Flow Diagram

Figure 9:
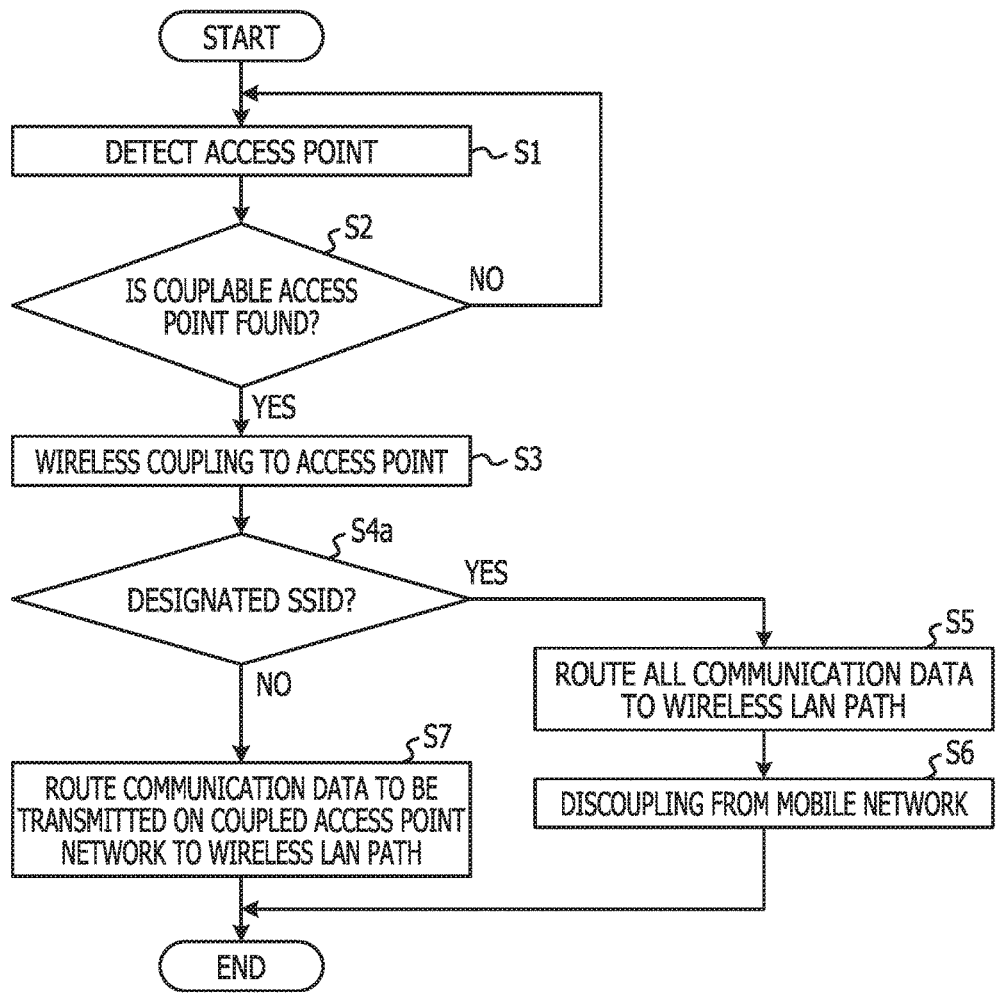
FIG. 9 is a flow diagram which describes a flow of the process of the terminal device of a second embodiment.

FIG. 9 is a flow diagram which describes a flow of the process of the terminal device 1 of the second embodiment. In the flow diagram in FIG. 9, S4 in FIG. 6 is substituted with S4a. Since S1 to S3 and S5 to S7 are described in FIG. 6, the description is omitted. After S3, the process transitions to S4a. Here, before S4a, the storage 102 stores the first SSID table T1 in FIG. 8.

The step S4a: the determining unit 11 determines whether or not the SSID of the wirelessly coupled access point is a designated SSID. In the case of the designated SSID (S4a/YES), the process transitions to S7. In the case of not being the designated SSID (S4a/NO), the process transitions to S5. The designated SSID is an SSID which is broadcast by the access point which does not provide access to the Internet.

In the example in FIG. 8, the determining unit 11 determines whether the wirelessly coupled access point SSID is stored in the SSID column in the first SSID table T1 in FIG. 8, and whether the flag "true" is stored in association with the SSID (S4a). In a case where the wirelessly coupled access point SSID is included in the SSID which is stored in the SSID column in the first SSID table T1 in FIG. 8, and the flag "true" is stored in association with the SSID in the internet non-utilization column (S4a/YES), the process transitions to S7.

Meanwhile, in a case where the wirelessly coupled access point SSID is not stored in the SSID column in the first SSID table T1 in FIG. 8 (S4a/NO), the process transitions to S5. In addition, the wirelessly coupled access point SSID is stored in the SSID column in the first SSID table T1 in FIG. 8, but in a case where the flag "false" is not stored in association with the SSID (S4a/NO), the process transitions to S5.

Here, another example is described in which it is determined (S4a) whether it is possible to access the Internet INT using the wirelessly coupled access point. As another example, a character string which indicates the access point that does not provide access to the Internet is stored in advance in the SSID column in the first SSID table T1 in FIG. 8. For example, the character string is "NONINTERNET_". Then, "true" is stored in advance in the internet non-utilization column in association with the character string.

In addition, the access point which does not provide access to the Internet is broadcasted to include the SSID which includes the character string ("NONINTERNET_") in the beacon.

In a case where the determining unit 11 receives the SSID which has "NONINTERNET_" to the head of the SSID character string, the determining unit 11 determines that the SSID of the coupled access point is the designated SSID (S4a/YES). For example, when the SSID such as "NONINTERNET_abc" or "NONINTERNET_wlan" are received, the determining unit 11 determines that the SSID of the coupled access point is the designated SSID.

Here, as described above, the character string "NONINTERNET_" or the flag "true" may be set by the user via the settings screen. In the present embodiment, the SSID of the terminal device 1 is utilized, but the BSSID of the terminal device 1 may be utilized.

Due to the determination process which is described in the present embodiment, it is possible to determine whether it is possible for the terminal device 1 to access the Internet INT using the wirelessly coupled access point. In the determination, since the terminal device 1 only compares the SSID stored in the device and the received SSID, a processing time shortens and the processing load is slight. For this reason, it is possible to suppress an increase in power consumption of the terminal device 1.

Third Embodiment

The third embodiment describes a second example of a process (S4 in FIG. 6) which determines whether there is a coupling to the Internet INT using the coupled access point, which is described in the first embodiment. The second example will be described with reference to FIG. 10.

Flow Diagram

Figure 10:
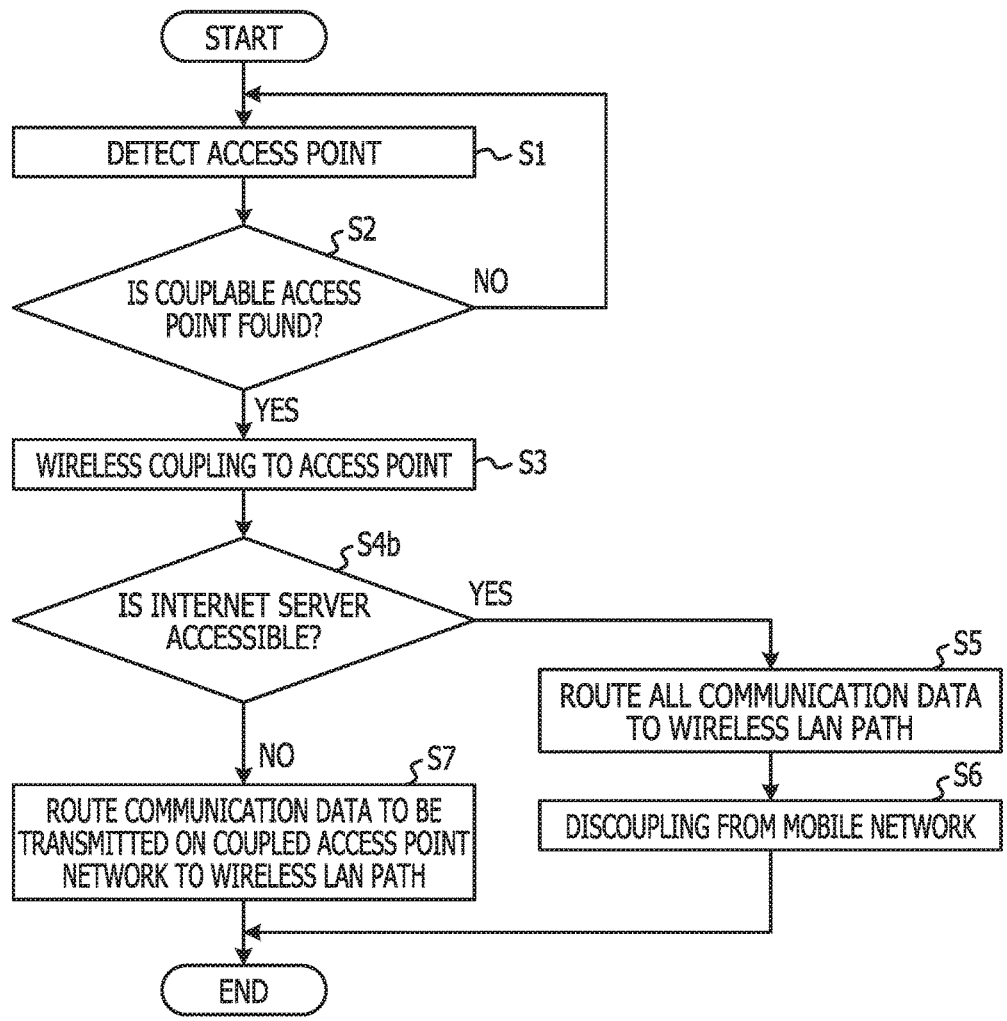
FIG. 10 is a flow diagram which describes a flow of the process of the terminal device of a third embodiment.

FIG. 10 is a flow diagram which describes a flow of the process of the terminal device 1 of the third embodiment. In the flow diagram in FIG. 10, S4 in FIG. 6 is substituted with S4b. Since S1 to S3 and S5 to S7 are described in FIG. 6, the description is omitted. After S3, the process transitions to S4b.

Step S4b: the determining unit 11 determines the accessibility to the internet server (for example, the internet server SVR1 in FIG. 1) using the coupled access point. When it is determined that the internet server is accessible (S4b/YES), the process transitions to S5. When it is not determined that the internet server is accessible (S4b/NO), the process transitions to S7.

For example, it is assumed that a global IP address of the internet server SVR1 in FIG. 1 is "202.219.48.177". First, the routing unit 13 performs the following settings in order not to inhibit network access using a service which operates in the background. That is, the routing unit 13 sets such that only the communication data which sets the internet server SVR1, where the global IP address is "202.219.48.177", as the transmission destination is routed on the wireless LAN path. In other words, the routing unit 13 transfers the communication data which sets the internet server SVR1 as the transmission destination to the second communication device 108 via the wireless LAN network IF unit 16. The second communication device 108 transfers the communication data to the coupled access point.

For example, as the setting method, for example, if the routing unit 13 uses a shell command which provides the Android (Android is a registered trademark) OS, the execution instruction of the shell command which is indicated by "route add 202.219.48.177 dev wlan0" is performed in the operating system. Here, "wlan0" is a parameter which indicates a network interface of the mobile network.

For example, the communication data is communication data which includes a so-called ping command, or is communication data which indicates a hypertext transfer protocol (http) request.

After transmission of the communication data, when receiving the communication data which indicates a response from the internet server SVR1 within a predetermined time, the determining unit 11 determines that the internet server SVR1 is accessible using the coupled access point (S4b/YES).

Here, the wireless LAN network IF unit 16 transfers the communication data which indicates the response to the determining unit 11 via the setting unit 12.

Meanwhile, after transmission of the communication data, when the communication data which indicates the response from the internet server SVR1 in not received within a predetermined time, the determining unit 11 does not determine that the internet server SVR1 is accessible using the coupled access point (S4b/NO).

Here, after S4b ends, the routing unit 13 cancels the setting. In the example described above, the routing unit 13 instructs cancellation of execution of a shell command "route add 202.219.48.177 dev wlan0" to the operating system.

As described above, the determining unit 11 transmits a first signal which requests a response to a third device (for example, the internet server SVR1) which belongs to the Internet INT. For example, the first signal is a signal which includes communication data that includes a ping command, or communication data which indicates an http request. When a second signal which is a response to the first signal is received from the third device (S4b/YES), the determining unit 11 determines that there is a coupling to the Internet INT using the access point that is wirelessly coupled using the second communication device 108. The second signal is a signal which includes communication data that indicates the response from the internet server SVR1.

When the second signal which is a response to the first signal is not received from the third device (S4b/NO), the determining unit 11 determines that there is no coupling to the Internet INT using the access point that is wirelessly coupled using the second communication device 108.

According to the present embodiment, the SSID setting which is described in FIG. 7 of the second embodiment is not desired.

In addition, according to the present embodiment, even in a case where the internet access point stops providing access to the Internet for some reason, it is possible to precisely determine whether or not it is possible to couple to the Internet INT using the coupled access point. Precise determination being possible is actually because the communication data is transmitted on the internet server SVR1 using the coupled access point.

In addition, since the provider who installs the access point omits and simplifies various settings at the access point, there are times when the same SSID is set in a plurality of access points so as to broadcast. Then, there are times when the provider performs the following settings in the plurality of access points which broadcast the same SSID. In this setting, an access point is set such that access to the Internet is provided, and another access point is set such that access to the Internet is not provided.

According to the determination (S4b) of the present embodiment, actually, the communication data is transmitted to the internet server SVR1 using the coupled access point. For this reason, even if the settings described above are performed, the provider is able to reliably determine whether it is possible to couple to the Internet INT using the coupled access point.

Fourth Embodiment

In the fourth embodiment, it is determined whether there is a coupling to the Internet INT using the coupled access point using the internet server which is coupled to the Internet INT (S4b in FIG. 10). The present embodiment describes a process in which it is determined whether there is a coupling to the Internet INT using the coupled access point using the coupled access point. First, an access point configuration is described with reference to FIGS. 11 and 12.

Hardware Configuration

Figure 11:
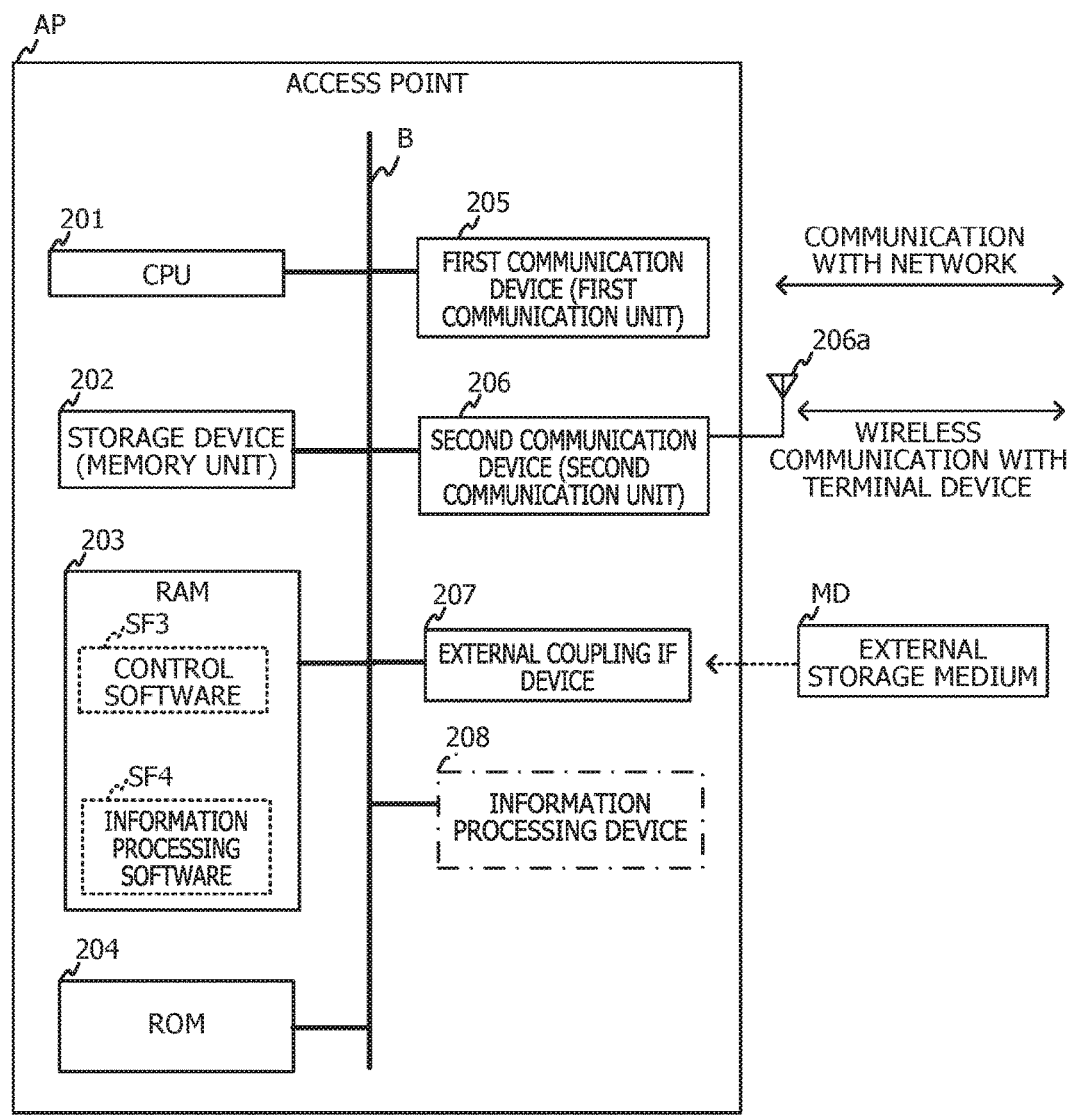
FIG. 11 is a block diagram illustrating a hardware configuration of an access point.

FIG. 11 is a block diagram illustrating a hardware configuration of the access point. The access point AP in FIG. 11 is, for example, a highly functional access point or a switchable access point from within the access points described in FIG. 1.

The access point AP is coupled to the bus B, and has a CPU 201, a storage device (memory unit) 202, a RAM 203, and a ROM 204. Furthermore, the access point AP has a first communication device (first communication unit) 205, a second communication device (second communication unit) 206, an externally coupled IF device 207, and an information processing device 208.

Below, the storage device (memory unit) 202 is referred to as a storage 202, as appropriate, the first communication device (first communication unit) 205 is referred to as a first communication device 205, as appropriate, and the second communication device (second communication unit) 206 is referred to as a second communication device 206, as appropriate.

The CPU 201 is a central processing unit which controls the entire access point AP. For example, the storage 202 is a large-capacity storage device such as a hard disk drive, a solid state drive, and a non-volatile semiconductor memory.

The RAM 203 temporarily stores the processes which are executed by the CPU 201, data which is generated (calculated) in each step in which control software SF3 and information processing software SF4 are executed, and the like. For example, the RAM 203 is a semiconductor memory such as a DRAM.

The control software SF3 is software which executes various controls. The control software SF3 is described in detail in FIG. 12. The information processing software SF4 is software which provides various information processing in the terminal device 1 that is coupled to the access point AP. For example, in a case where the access point AP is installed in a shop, the information processing software SF4 performs information processing in which information which relates to the shop or data in which a coupon that is able to be used at the shop is output for display is transmitted to the wirelessly coupled terminal device.

The CPU 201 reads out an execution file of the coupling software SF3 and the information processing software SF4 from the ROM 204 and develops in the RAM 203 during start up of the access point AP. Here, the execution file may be stored in an external storage medium MD.

The ROM 204 stores various data, for example, the execution files (programs) of the control software SF3 and the information processing software SF4.

The first communication device 205 is a communication device which communicates with the network (for example, the Internet INT). However, in the description in the present embodiment, the operation of the first communication device 205 is in a stopped state, or a state in which coupling between the first communication device 205 and the network is not performed.

The second communication device 206 is a device which executes a function as the access point of a so-called wireless LAN. In detail, the second communication device 206 transmits and receives radio waves using an antenna 206a, is wirelessly coupled to the terminal device 1, and after establishing the wireless coupling, wirelessly communicates with the terminal device 1. The second communication device 206 regularly broadcasts packets which are normally referred to as beacons that are described in FIG. 1.

Then, authentication information which is transmitted from the terminal device 1 is received, and the terminal device 1 is authenticated based on the received authentication information. When authentication is successful, then wireless communication with the terminal device 1 is executed. Meanwhile, when authentication fails, then wireless communication with the terminal device 1 is not executed.

The externally coupled IF device 207 is a device which functions as an interface for coupling the access point AP and the external storage medium MD. For example, the externally coupled IF device 207 is a card slot or a USB port.

Here, the externally coupled IF device 207 may be configured to be coupled to a storage medium reading device (not illustrated in the drawings) which reads data that is stored in the storage medium. For example, the storage medium (also referred to as the recording medium) is a portable storage medium such as a CD-ROM or a DVD.

The information processing device 208 is hardware which has the same function as the information processing software SF4. That is, the information processing device 208 is a device which provides various information processing in the terminal device 1 that is coupled to the access point AP. In a case where the information processing device 208 is provided in the access point AP, a program of the information processing software SF4 is not stored in the ROM 204. Meanwhile, in a case where the program of the information processing software SF4 is stored in the ROM 204, the information processing device 208 is not provided in the access point AP. Since there are also cases where such an information processing device is not provided, the program of the information processing device 208 is indicated by a dashed line.

Software Configuration

Figure 12:
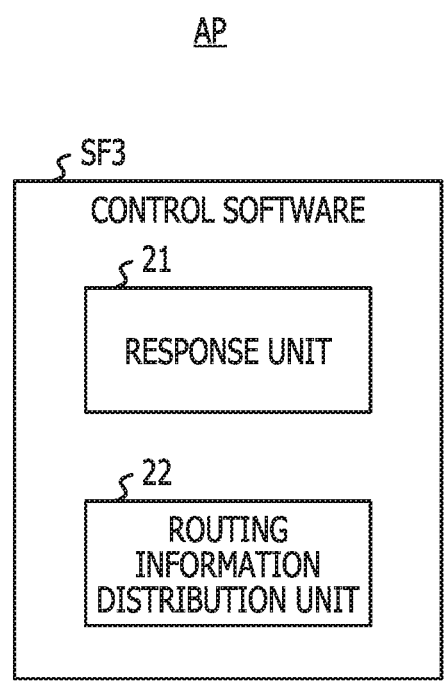
FIG. 12 is a block diagram which describes a first example of a software configuration of an access point in FIG. 11.

FIG. 12 is a block diagram which describes a first example of a software configuration of the access point AP in FIG. 11. The control software SF3 has a response unit 21 and a routing information distribution unit 22.

When a command is received which queries whether or not the access point AP provides access to the Internet INT from the terminal device 1, the response unit 21 executes a process which responds to the query command.

Here, the response unit 21 may deem that the query command is received and execute the process in response at a timing at which the terminal device 1 is wirelessly coupled to the access point AP.

Here, in a case where the access point AP provides access to the Internet INT, the second communication device 206 of the access point AP provides various setting information in the terminal device 1 which establishes or authenticates the wireless coupling. For example, the various setting information is setting information of a domain name system (DNS) server and setting information of the default gateway. For example, the setting information of the DNS server and the setting information of the default gateway function as a DHCP server which the access point AP provides, or is provided from the DHCP server of the network to which the access point AP is coupled. Here, DHCP is an abbreviation of "dynamic host configuration protocol".

The setting information of the DNS server includes the IP address of the DNS server. In addition, the setting information of the default gateway includes information that indicates that the access point AP is the default gateway.

In this manner, the provision of the setting information to the terminal device 1 is for the terminal device 1 to access the internet server. Accordingly, in a case where the access point AP does not provide access to the Internet INT, the second communication device 206 of the access point AP does not provide the setting information to the wirelessly coupled terminal device 1.

In a case where in the access point AP provides access to the Internet INT, when the query command is received, the response unit 21 transmits the various setting information to the terminal device 1. Meanwhile, in a case where, the access point AP does not provide access to the Internet INT, when the query command is received, the response unit 21 does not transmit the various setting information to the terminal device 1.

When the routing information distribution unit 22 receives the query command from the terminal device 1, in a case where the access point AP has a network domain which is not coupled to the Internet INT, the routing information is distributed to the terminal device 1. The routing information is information which indicates the IP address of the network domain. For example, the network domain is equivalent to the local network LNT in FIG. 1.

The routing information is set in the device which is coupled to a network other than the Internet INT (for example, the local network), and is an example of information (for example, the IP address) which identifies the device on the other network.

The routing information is stored in the storage 202 of the access point AP as a routing file.

Here, the routing information distribution unit 22 may deem that the query command is received at a timing at which the terminal device 1 is wirelessly coupled to the access point AP.

For example, the routing file is a file which stores a first shell command and a second shell command. The first and second shell commands are shell commands of a case where the operating system of the terminal device 1 is Android (Android is a registered trademark).

The first shell command is "route add 192.168.1.0 netmask 255.255.255.0 dev wlan0". The first shell command indicates that it is possible for the terminal device 1 to access a network domain "192.168.1.x" (x is an integer of 1 to 254) using the wirelessly coupled access point.

The second shell command is "route add 192.168.2.0 netmask 255.255.255.0 dev wlan0". The second shell command indicates that it is possible for the terminal device 1 to access a network domain "192.168.2.x" (x is an integer of 1 to 254) using the wirelessly coupled access point.

The shell command indicates that it is possible for the terminal device 1 to access the IP address which is a result of an AND operation between the IP address prior to "netmask" and a mask IP address subsequent to the "netmask" using the wirelessly coupled access point.

When the routing unit 13 of the terminal device 1 receives the first and second shell commands, an execution instruction of the shell commands is performed in the operating system. As a result, the routing unit 13 routes the communication data in which the IP address of the device that is coupled to the network domain is set as the transmission destination on the wireless LAN path. Here, the routing file may be a file which stores either shell command of the first shell command or the second shell command.

In a case where the access point AP provides access to the Internet INT, the routing information distribution unit 22 does not transmit the routing file.

Here, in order to avoid overlapping description, in the software block diagram in FIG. 12, the control software SF3 is configured so as to have the response unit 21 and the routing information distribution unit 22. However, the control software SF3 may have the function of either one of the response unit 21 and the routing information distribution unit 22.

Flow Diagram

Figure 13:
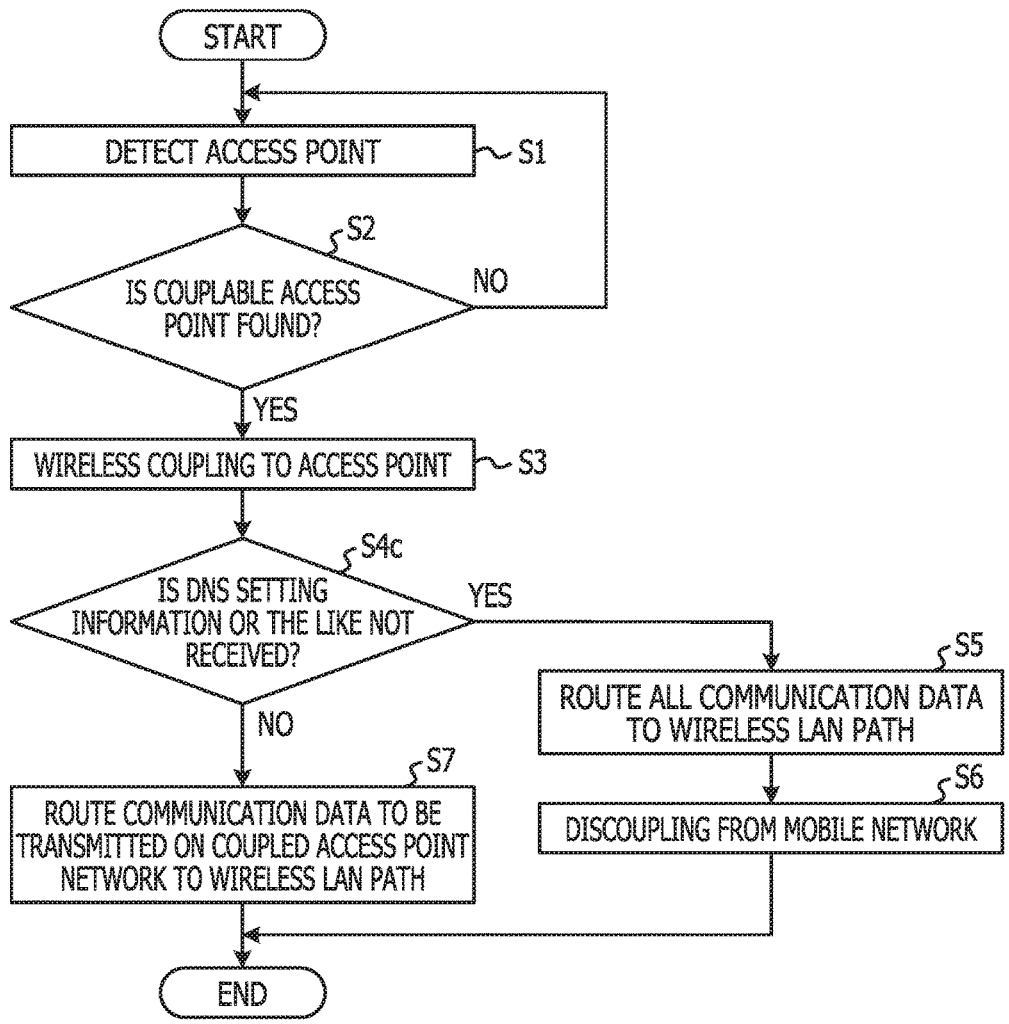
FIG. 13 is a first flow diagram which describes a flow of the process of the terminal device of a fourth embodiment.

FIG. 13 is a first flow diagram which describes a flow of the process of the terminal device 1 of the fourth embodiment. In the flow diagram in FIG. 13, S4 in FIG. 6 is substituted with S4c. Since S1 to S3 and S5 to S7 are described in FIG. 6, the description is omitted. After S3, the process transitions to S4c. Here, the determining unit 11 may transmit the query command which is described in FIG. 12 to the coupled access point.

Step S4c: the determining unit 11 determines whether the setting information of the DNS server or the setting information of the default gateway is not received from the coupled access point.

In a case where either or both of the setting information of the DNS server and the setting information of the default gateway is received (S4c/YES), the process transitions to S5. In a case where information of either the setting information of the DNS server or the setting information of the default gateway is not received (S4c/YES), the process transitions to S7.

As described above, when information is received which indicates that the access point is coupled to the Internet INT from the wirelessly coupled access point, the determining unit 11 determines NO in S4c. For example, the information is the setting information of the DNS server and the setting information of the default gateway. The determination (S4c/NO) determines that there is a coupling to the Internet INT using the access point that is wirelessly coupled using the second communication device 108.

Meanwhile, when the information is not received, the determining unit 11 determines YES in S4c. The determination (S4c/YES) determines that there is no coupling to the Internet INT using the access point that is wirelessly coupled using the second communication device 108.

According to the process described in FIG. 13, the access point AP is able to provide information which indicates whether the device is provided access to the Internet to the terminal device 1. For this reason, based on the information, the terminal device 1 is able to determine whether or not the coupled access point provides access to the Internet.

Figure 14:
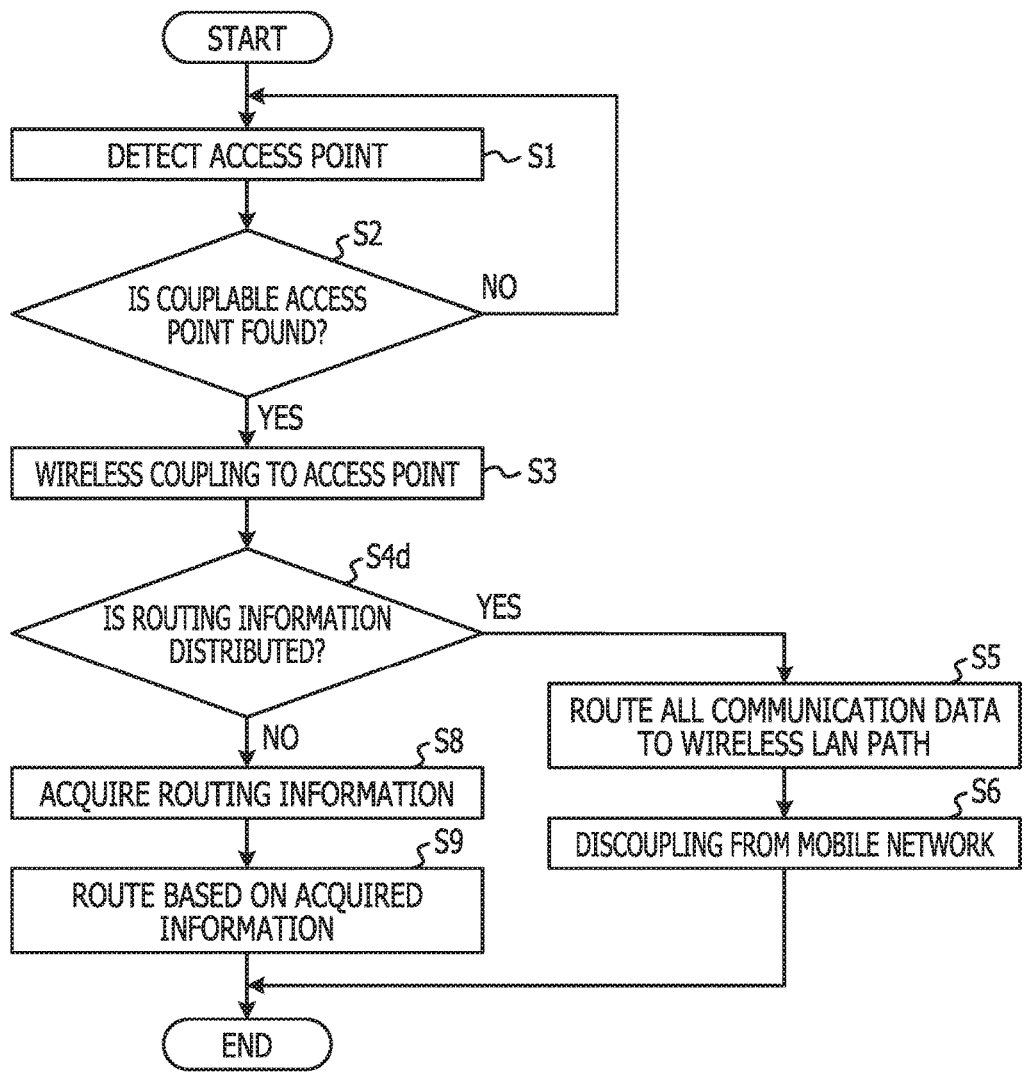
FIG. 14 is a second flow diagram which describes a flow of the process of the terminal device of the fourth embodiment.

FIG. 14 is a second flow diagram which describes a flow of the process of the terminal device 1 of the fourth embodiment. In the flow diagram in FIG. 14, S4 in FIG. 6 is substituted with S4d. Since S1 to S3 and S5 to S7 are described in FIG. 6, the description is omitted. After S3, the process transitions to S4d. Here, the determining unit 11 may transmit the query command which is described in FIG. 12 to the coupled access point.

Step S4d: the determining unit 11 determines whether the routing information is distributed from the coupled access point. In other words, the determining unit 11 determines whether the routing information is received. In a case where the routing information is not distributed from the coupled access point (S4d/NO), the process transitions to S5. Meanwhile, in a case where the routing information is distributed from the coupled access point (S4d/YES), the process transitions to S8.

As described above, when the determining unit 11 does not receive information which indicates that the access point is not coupled to the Internet INT from the wirelessly coupled access point, the determining unit 11 determines NO in S4d. For example, the information is routing information. The determination (S4d/NO) is a determination that there is a coupling to the Internet INT using the access point that is wirelessly coupled using the second communication device 108.

Meanwhile, when the information is received, the determining unit 11 determines YES in S4d. The determination (S4d/YES) is a determination that there is no coupling to the Internet INT using the access point that is wirelessly coupled using the second communication device 108.

Step S8: the routing unit 13 of the terminal device 1 receives the routing information via the second communication device 108, and stores the received routing information in the storage 102.

Step S9: the routing unit 13 of the terminal device 1 routes the communication data based on the received routing information. In detail, the routing unit 13 performs the execution instruction of the shell command which includes the received routing information in the operating system. As a result, the routing unit 13 routes the communication data in which the network domain is set as the transmission destination on the wireless LAN path.

In other words, the routing unit 13 transfers the data which includes the identifier of the routing information as the transmission destination address to the coupled access point via the second communication device 108. For example, in the shell command, the identifier of the routing information is the IP address which is a result of the AND operation between the IP address prior to "netmask" and the mask IP address subsequent to the "netmask".

According to the process described in FIG. 14, the access point AP is able to provide information which indicates whether or not the device is provided access to the Internet to the terminal device 1. Furthermore, even in a case where the device which is able to access using the coupled access point belongs to a plurality of network domains, it is possible for the terminal device 1 to access the device through the wireless LAN path. For example, the device is the local server which is not coupled to the Internet.

Fifth Embodiment

Power consumption of wireless communication (mobile communication) which is executed by the first communication device 107 is comparatively larger than power consumption of wireless communication (wireless LAN communication) which is executed by the second communication device 108. In addition, in mobile communication which is executed by the first communication device 107, there are times when the amount of communication which it is possible to use in units of one month or one day is limited.

In this manner, in order to further reduce power consumption, or in order to further reduce the amount of communication, it is preferable that the mobile communication which is executed by the first communication device 107 is quickly stopped. Therefore, the present embodiment describes the terminal device 1 in which the mobile communication is quickly stopped.

Figure 15:
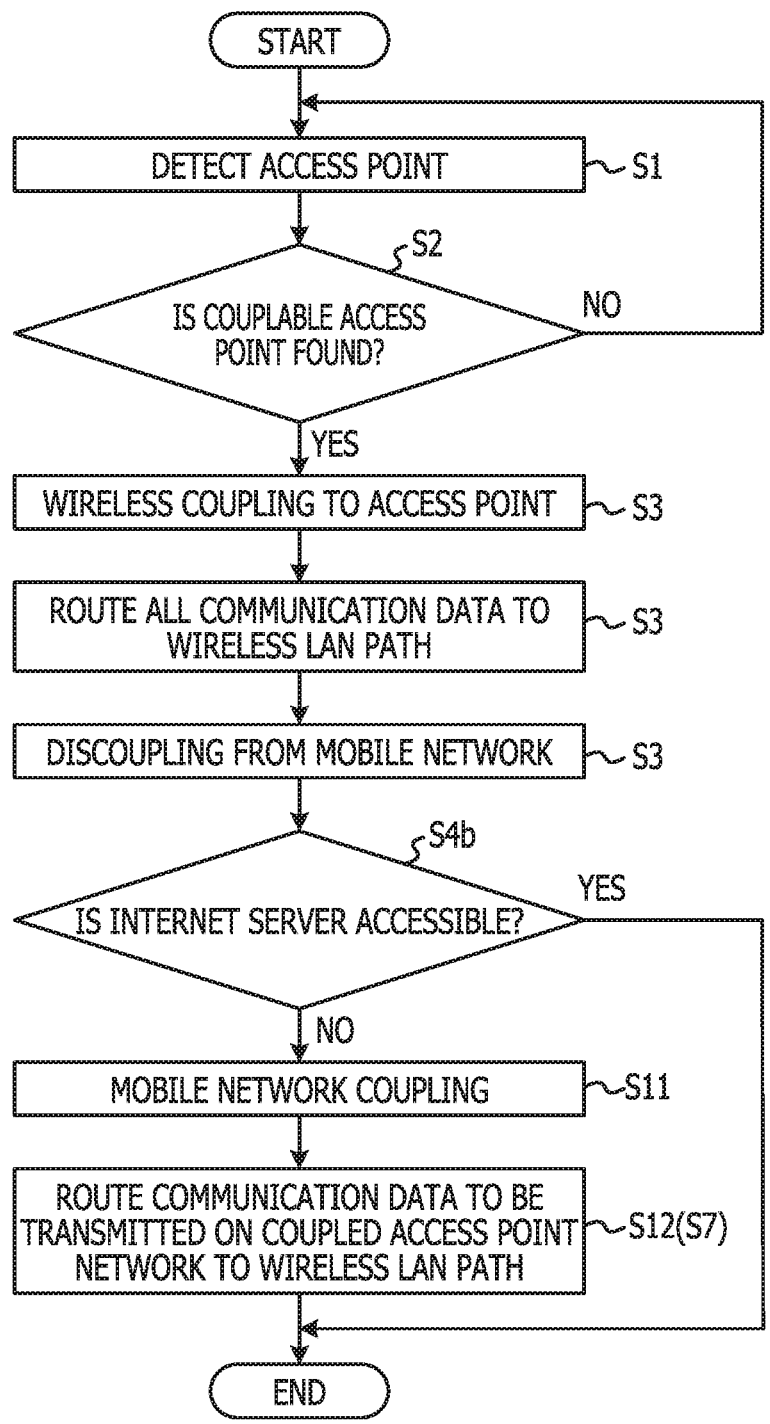
FIG. 15 is a flow diagram which describes a flow of the process of the terminal device of a fifth embodiment.

FIG. 15 is a flow diagram which describes a flow of the process of the terminal device 1 of the fifth embodiment. The coupling unit 15 of the terminal device 1 detects the access point (S1 in FIG. 6), and determines whether the couplable access point is found (S2). In a case where the couplable access point is found (S2/YES in FIG. 6), the coupling unit 15 wirelessly couples to the access point which is found in S2 via the second communication device 108 (S3 in FIG. 6).

After S3, the routing unit 13 routes all communication data on the wireless LAN path (S5). Subsequently, the mobile network IF unit 14 discouples from the mobile network (S6). Due to the discoupling, the mobile communication which is executed by the first communication device 107 is stopped.

After S6, the determining unit 11 determines the accessibility to the internet server (for example, the internet server SVR1 in FIG. 1) using the coupled access point (S4b).

When it is determined that the internet server is accessible (S4b/YES), the process ends. Due to the ending of the process, the first communication device 107 continues to stop wireless communication.

Meanwhile, when it is not determined that the internet server is accessible (S4b/NO), the process transitions to S11.

Step S11: the first communication device 107 restarts coupling to the mobile network. In detail, the mobile network IF unit 14 instructs restarting of the mobile communication in the first communication device 107. The first communication device 107 restarts the mobile communication in response to the operation instruction.

Due to the performance of the process of S11, the terminal device 1 is not able to couple to the Internet INT using the coupled access point. Therefore, the terminal device 1 couples to the Internet INT using the first communication device 107.

Step S12: the routing unit 13 only routes the communication data which is transmitted on the network of the coupled access point on the wireless LAN path. The process of S12 is the same process as S7 which is described in FIG. 6.

The mobile communication which is executed by the first communication device 107 is stopped due to the discoupling from the mobile network (S6 in FIG. 15). For this reason, it is possible to quickly stop the mobile communication. Describing in detail, for example, until the terminal device 1 which is described in the first embodiment stops the mobile communication, as indicated in the flow diagram in FIG. 6, from the end of S3, after the processes of S4 and S5 have elapsed, the mobile communication is stopped (S6). However, in a case of the terminal device 1 in the present embodiment, S3 ends, then after the process of S5 elapses, the mobile communication is stopped (S6). That is, it is possible to stop the mobile communication by omitting the process of the determination step (S4).

Since the determination step (S4) is omitted in this manner, it is possible to quickly stop the mobile communication in comparison to the terminal device 1 in the second to fourth embodiments according to the terminal device 1 of the present embodiment.

Sixth Embodiment

The terminal device 1 of the present embodiment establishes wireless communication with the access point which provides access to the Internet INT, then when wirelessly coupled, stores the identifier which identifies the access point. By storing the identifier, in a case where the terminal device 1 couples to the access point again, it is possible to determine that the access point provides access to the Internet INT based on the identifier.

When the determining unit 11 of the terminal device 1 determines that there is a coupling to the Internet INT using the access point AP that is wirelessly coupled using the second communication device 108, the identifier (for example, the SSID and BSSID) which identifies the access point AP is stored in the storage 102.

When the identifier of the wirelessly recoupled access point AP is stored in the storage 102, the determining unit 11 determines that there is a coupling to the Internet INT using the access point AP which is wirelessly recoupled.

Meanwhile, when the identifier of the wirelessly recoupled access point AP is not stored in the storage 102, the determining unit 11 determines that there is no coupling to the Internet INT using the access point AP which is wirelessly recoupled.

Storage of the identifier will be described below in detail. When the determining unit 11 determines that there is a coupling to the Internet INT using the wirelessly coupled access point AP, the access point which is associated with the broadcasted SSID and BSSID is stored in the storage 102.

FIG. 16 is an example of a table which stores SSID and BSSID. A second SSID table T2 has the SSID column, the BSSID column, and the internet non-utilization column. The second SSID table T2 is stored in the SSID memory region R of the storage 102 in FIG. 2.

The SSID column stores the SSID of the access point which provides access to the Internet INT. The BSSID column stores the BSSID of the access point.

In FIG. 16, "hoge" is stored as the SSID in the SSID column, "01:02:03:04:05:06" is stored as the BSSID in the BSSID column, and the flag "false" is stored in the internet non-utilization column.

The determining unit 11 of the terminal device 1 determines that there is a coupling to the Internet INT using the coupled access point (S4/YES in FIG. 6). When the determining unit 11 performs determination (S4/YES), the flag "false" and the SSID and the BSSID of the received coupled access point are stored in association in the storage 102.

For example, the coupling unit 15 of the terminal device 1 receives the SSID "hoge" which is broadcasted by the coupled access point, and the BSSID "01:02:03:04:05:06" of the coupled access point. When the determining unit 11 performs the determination (S4/YES), as indicated in the second SSID table T2, the SSID "hoge", the BSSID "01:02:03:04:05:06", and the flag "false" are stored in association in the storage 102.

The terminal device 1 stores the SSID and the BSSID, then, for example, outputs from out of the wireless communication range of the coupled access point. Here, when the terminal device 1 outputs from out of the wireless communication range of the coupled access point, the first communication device 107 starts mobile communication.

Then, the coupling unit 15 of the terminal device 1 starts a detection process of the access point (S1 in FIG. 6). In the detection, the coupling unit 15 receives the SSID (for example, "hoge") and the BSSID (for example, "01:02:03: 04:05:06") of the couplable access point, and stores in, for example, the RAM 103.

When the couplable access point is found (S2/YES), the coupling unit 15 wirelessly couples to the access point (S3).

The determining unit 11 determines that there is a coupling to the Internet INT via the access point which is wirelessly recoupled in S3 (the coupled access point) (S4). In a case where the second SSID table T2 in FIG. 16 is stored in the storage 102, the determining unit 11 performs the following determination. That is, the determining unit 11 determines that the flag "false" and the SSID and the BSSID of the received coupled access point are stored in the same row of the second SSID table T2.

In a case where the determining unit 11 determines that the flag "false" and the SSID and the BSSID of the received coupled access point are stored in the same row of the second SSID table T2, the determining unit 11 determines that there is a coupling to the Internet INT using the coupled access point (S4/YES).

Meanwhile, in a case where the determining unit 11 determines that the flag "false" and the SSID and the BSSID of the received coupled access point are not stored in the same row of the second SSID table T2, the determining unit 11 determines that there is no coupling to the Internet INT using the coupled access point (S4/NO).

For example, in a case where the SSID and the BSSID of the received coupled access point are respectively "hoge" and "01:02:03:04:05:06", the SSID and the BSSID of the received coupled access point and the flag "false" are stored in the same row in the second SSID table T2. Accordingly, in the determination (S4), the determining unit 11 determines that there is a coupling to the Internet INT using the coupled access point (S4/YES).

Here, in the description above, not only the SSID, but also the BSSID is stored. In this manner, the reason that the SSID and the BSSID are stored will be described. For example, as described in the third embodiment, there are times when the provider performs the following settings in the plurality of access points which broadcast the same SSID. In this setting, an access point is set such that access to the Internet is provided, and another access point is set such that access to the Internet is not provided. Here, the BSSID which uniquely identifies each access point is allocated to each of the plurality of access points which broadcast the same SSID.

In a case where the operator performs setting, the determining unit 11 assumes a case in which the SSID of the first access point which provides access to the Internet INT (first assumption) is stored in the storage 102.

Furthermore, the second access point does not provide access to the Internet, but it is assumed (second assumption) that the same SSID as the SSID of the first access point is broadcast.

In the case where the SSID which is received from the recoupled coupled access point matches the SSID that is stored in the storage 102, the determining unit 11 determines that the coupled access point provides access to the Internet (S4/YES). Here, the SSID which is stored in the storage 102 is an SSID of the first access point SSID.

Here, in a case where the recoupled coupled access point is the first access point, determining that the coupled access point provides access to the Internet is the correct determination. However, in a case where the recoupled coupled access point is the second access point, determining that the coupled access point provides access to the Internet is an erroneous determination. The erroneous determination which occurs in this manner is because the second access point broadcasts the same SSID as the SSID of the first access point (refer to the second assumption).

Therefore, in order to avoid erroneous determination, the BSSID which uniquely identifies the access point that provides access to the Internet is stored in the storage 102, and the BSSID is also a comparison target.

According to the present embodiment, the SSID and the BSSID of the coupled access point are stored in association as a determination result in which the coupled access point is an access point that provides access to the Internet. For this reason, in a case where the terminal device 1 is wirelessly coupled again to the coupled access point, if the stored SSID and BSSID are referenced, it is possible to determine that the coupled access point is an access point which provides access to the Internet.

According to the determination, since the terminal device 1 may not communicate with the external device (for example, the internet server) which executes wireless communication, it is possible to reduce the amount of data for communication. Furthermore, since the terminal device 1 may not communicate with the external device, it is possible to reduce power consumption according to communication.

Seventh Embodiment

In the present embodiment, a switchable access point which is described in FIG. 1 will be described. In the manner of the twenty-first access point AP21 in FIG. 1, the switchable access point is an access point which has a function of switching whether or not access is provided to the Internet INT in the terminal device according to the terminal device which is wirelessly coupled. The hardware configuration of the switchable access point is the same as the hardware configuration which is described in the hardware block diagram in FIG. 11.

The storage 202 of the access point AP in FIG. 11 stores the authentication information which is described in step S103 in FIG. 18 and the identifier of the terminal device 1 which provides access to the Internet which described in step S104 in FIG. 18.

The first communication device 205 of the access point AP in FIG. 11 communicates with the Internet INT.

Access Point Configuration

FIG. 17 is a block diagram which describes a second example of a software configuration of the access point that is described in FIG. 11. The control software SF3 has an internet access provision determining unit 31, an internet relay switching unit 32, and an internet relay unit 33. Here, in FIG. 17, each unit (31 to 33) is able to transmit and receive various signals with each other. In FIG. 17, the first communication device 205 and the second communication device 206 which are hardware are indicated by dotted lines.

The internet access provision determining unit 31 determines whether or not access is provided to the Internet INT in the terminal device 1 based on the identifier (for example, a user identifier) of the terminal device 1 which is transmitted from the terminal device and the user identifier which is stored in the storage 202.

The internet relay switching unit 32 instructs switching of the relay of communication between the network and the terminal device to the internet relay unit 33. In detail, the internet relay switching unit 32 instructs the internet relay unit 33 so as to relay communication between the terminal device 1 which provides access to the Internet (hereinafter, referred to as an accessible terminal device 1, as appropriate) and the Internet. The internet relay unit 33 relays communication between the accessible terminal device 1 and the Internet in response to the instruction. The internet relay unit 33 is an example of a relay unit which relays data.

Flow Diagram

FIG. 18 is a block diagram which describes a flow of a process of a highly functional access point. In the description in FIG. 18, the highly functional access point is described as the access point AP.

Step S101: the second communication device 206 of the access point AP waits on wireless coupling from the terminal device 1. In detail, the second communication device 206 regularly broadcasts packets which are normally referred to as beacons that are described in FIG. 1.

Step S102: when the second communication device 206 receives a coupling request from the terminal device 1, the second communication device 206 wirelessly couples to the terminal device 1.

Step S103: the second communication device 206 performs authentication on the terminal device 1. In detail, the second communication device 206 performs a transmission request for the authentication information. The coupling unit 15 of the terminal device 1 transmits the authentication information which includes the user identifier, the password, and the SSID to the access point AP in response to the transmission request. Here, the user identifier is an identifier which uniquely identifies the user of the terminal device 1 or the terminal device 1.

Here, the authentication information of the terminal device which is set as a comparison target during authentication and performs communication with the access point AP is stored in the storage 202 of the access point AP.

The second communication device 206 compares the authentication information which is received from the terminal device 1 and the authentication information which is stored in the storage 202, and in the case of a match, authenticates the terminal device 1. Then, the second communication device 206 performs wireless communication with the authenticated terminal device 1. Meanwhile, in a case where the authentication information which is received from the terminal device 1 and the authentication information which is stored in the storage 202 do not match, the second communication device 206 does not authenticate the terminal device 1, and thereafter, wireless communication is not performed with the terminal device 1.

Step S104: the internet access provision determining unit 31 of the access point AP determines whether access is provided to the Internet in the wirelessly coupled terminal device 1. Here, the storage 202 of the access point AP stores the identifier (hereinafter, referred to as an identifier of a premium user, as appropriate) of the terminal device 1 which is provided access to the Internet.

The internet access provision determining unit 31 compares the identifier of the premium user which is stored in the storage 202 and the user identifier of the received authentication information (refer to S103).

In a case where the identifier of the premium user and the user identifier of the authentication information match, the internet access provision determining unit 31 determines that access is provided to the Internet in the wirelessly coupled terminal device 1 (S104/YES). Then, the process transitions to S105.

In a case where the identifier of the premium user and the user identifier of the authentication information do not match, the internet access provision determining unit 31 determines that access is not provided to the Internet in the wirelessly coupled terminal device 1 (S104/NO). Then, the process transitions to S106.

Step S105: the internet relay switching unit 32 instructs switching of the relay of communication between the Internet INT and the terminal device 1 to the internet relay unit 33. The internet relay switching unit 32 instructs the internet relay unit 33 to relay communication between the wirelessly coupled terminal device 1 and the Internet INT.

The internet relay unit 33 relays communication between the wirelessly coupled terminal device 1 and the Internet in response to the instruction.

In detail, in a case where the IP address of the transmission destination of the communication data that is received from the wirelessly coupled terminal device 1 is the IP address of a device which is coupled to the Internet INT, the internet relay unit 33 outputs the communication data to the first communication device 205. For example, the device which is coupled to the Internet INT is the internet server SVR1 in FIG. 1. The first communication device 205 transmits the communication data on the Internet INT.

As described above, the internet relay unit 33 relays the data which is transmitted from the wirelessly coupled terminal device 1 using the second communication device 206 and sets the device which is coupled to the Internet INT as the transmission destination to the device via the first communication device 205.

Here, in the case of the device with the IP address of the transmission destination of the communication data that is received from the wirelessly coupled terminal device 1, the internet relay unit 33 outputs the communication data to the information processing software SF4.

Step S106: the internet relay switching unit 32 does not instruct switching of the relay of communication between the Internet INT and the terminal device 1 to the internet relay unit 33. As a result, in the case where the IP address of the transmission destination of the communication data that is received from the wirelessly coupled terminal device 1 is the IP address of the device which is coupled to the Internet INT, the internet relay unit 33, for example, corrupts the communication data. The internet relay unit 33 may notify an instruction in which access is not provided to the Internet to the wirelessly coupled terminal device 1.

Here, when the internet access provision determining unit 31 determines that access is provided to the Internet in the wirelessly coupled terminal device 1 (S104/YES), various setting information which is described in FIG. 12 is transmitted to the wirelessly coupled terminal device 1. Here, the various setting information is the setting information of the DNS server and the setting information of the default gateway.

In addition, when the internet access provision determining unit 31 determines that access is not provided to the Internet in the wirelessly coupled terminal device 1 (S104/NO), the routing information which is described in FIG. 12 may be transmitted to the wirelessly coupled terminal device 1. Using the routing information, as described in FIG. 14, even in a case where the device which is able to access using the coupled access point belongs to a plurality of network domains, it is possible for the terminal device 1 to access the device through the wireless LAN path.

In a case where there are many terminal devices which access the Internet using the access point AP, for example, a process in the second communication device 206 of the access point AP is increased in size. As a result, there are times when the speed of communication between the access point AP and the terminal device is reduced. In addition, there are times when a response with respect to the terminal device is delayed.

However, according to the present embodiment, the user (premium user) who is provided access to the Internet is designated in advance, and access is provided to the Internet on the terminal device of the user. Meanwhile, according to the present embodiment, access is not provided to the Internet on the terminal device of the user other than the premium user.

As a result, it is possible to suppress the decrease in the communication speed and the delay in response by suppressing an increase in the number of terminal devices which access the Internet using the access point AP.

Furthermore, even in the terminal device of the user other than the premium user, since it is possible to receive the routing information in the manner above, the terminal device is able to access the network domain to which the access point AP belongs based on the routing information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal device comprising:
    a first network interface configured to perform a first wireless communication with a first device coupled to a specified network;
    a second network interface configured to perform a second wireless communication with a second device; and
    a processor configured to:
        select one of the first network interface and the second network interface, the first network interface being selected when it is determined that the second device is not coupled to the specified network, the second network interface being selected when it is determined that the second device is coupled to the specified network, and
        control the selected one of the first network interface and the second network interface to perform a wireless communication.

2. The terminal device according to claim 1, wherein the processor is further configured to:
    before selecting the one of the first network interface and the second network interface, when the first network interface performs the first wireless communication with the first device, control the second network interface to perform the second wireless communication with the second device,
    when the first network interface is selected, control the second network interface to stop the second wireless communication with the second device, and
    when the second network interface is selected, control the first network interface to stop the first wireless communication with the first device.

3. The terminal device according to claim 1, wherein the first network interface is configured to communicate with the specified network via the first device when the first network interface is selected, and the second network interface is configured to communicate with the specified network via the second device when the second network interface is selected.

4. The terminal device according to claim 1, further comprising:
    a memory configured to store each of identifiers of each of second devices, wherein
    the processor is configured to receive an identifier of the second device from the second device,
    the first network interface is selected when the received identifier is not one of the stored identifiers, and
    the second network interface is selected when the received identifier is one of the stored identifiers.

5. The terminal device according to claim 1, wherein the processor is configured to transmit a specified signal using the second wireless communication via the second device, the specified signal requesting a response to a third device that is coupled to the specified network,
    the first network interface is selected when not receiving the response from the third signal, and
    the second network interface is selected when receiving the response from the third signal.

6. The terminal device according to claim 1, wherein the first network interface is selected when not receiving, from the second device, first information indicating that the second device couples to the specified network, and
    the second network interface is selected when receiving, from the second device, the first information.

7. The terminal device according to claim 6, wherein the first information is information set to the terminal device for communicating with a device coupled to the specified network.

8. The terminal device according to claim 1, wherein the first network interface is selected when not receiving, from the second device, second information indicating that the second device does not couple to the specified network, and
    the second network interface is selected when receiving, from the second device, the second information.

9. The terminal device according to claim 8, wherein the second information is information set to a device coupled to another network differing from the specified network and identifies each device in the other network.

10. The terminal device according to claim 1, wherein when the first network interface is selected, the processor is configured to:
    transfer first data to the first device when a destination of the first data is a device coupled to the specified network, and
    transfer second data to the second device when a destination of the second data is the second device or a device coupled to another network differing from the specified network.

11. The terminal device according to claim 1, wherein when the second network interface is selected, the processor is configured to transfer data to the second device.

12. The terminal device according to claim 1, wherein the specified network is the Internet.

13. A communication method comprising:
    selecting one of a first network interface and a second network interface of a terminal device, the first network interface being configured to perform a first wireless communication with a first device, coupled to a specified network, the second network interface being configured to perform a second wireless communication with a second device, the first network interface being selected when it is determined that the second device is not coupled to the specified network, the second network interface being selected when it is determined that the second device is coupled to the specified network; and controlling the selected one of the first network interface and the second network interface to perform a wireless communication.

14. A non-transitory computer-readable storage medium storing a program that causes a computer to execute a process, the computer including a memory, the process comprising:

selecting one of a first network interface and a second network interface of a terminal device, the first network interface being configured to perform a first wireless communication with a first device coupled to a specified network, the second network interface being configured to perform a second wireless communication with a second device, the first network interface being selected when it is determined that the second device is not coupled to the specified network, the second network interface being selected when it is determined that the second device is coupled to the specified network; and controlling the selected one of the first network interface and the second network interface to perform a wireless communication.

* * * * *